US011165505B2

(12) United States Patent
Gordon et al.

(10) Patent No.: US 11,165,505 B2
(45) Date of Patent: Nov. 2, 2021

(54) QUANTUM ATOMIC RECEIVING ANTENNA AND QUANTUM SENSING OF RADIOFREQUENCY RADIATION

(71) Applicant: Government of the United States of America, as represented by the Secretary of Commerce, Gaithersburg, MD (US)

(72) Inventors: Joshua Ari Gordon, Lafayette, CO (US); Christopher Lee Holloway, Boulder, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 17/173,476

(22) Filed: Feb. 11, 2021

(65) Prior Publication Data

US 2021/0250101 A1    Aug. 12, 2021

Related U.S. Application Data

(60) Provisional application No. 62/975,424, filed on Feb. 12, 2020.

(51) Int. Cl.
*H04B 10/532* (2013.01)
*H04B 10/70* (2013.01)
*H04B 10/50* (2013.01)

(52) U.S. Cl.
CPC ......... *H04B 10/532* (2013.01); *H04B 10/503* (2013.01); *H04B 10/70* (2013.01); *H04B 2210/006* (2013.01)

(58) Field of Classification Search
None
See application file for complete search history.

(56) References Cited

U.S. PATENT DOCUMENTS 5,095,312 A * 3/1992 Jehle ................... G01S 13/0209
                                                    342/21
10,509,065 B1 * 12/2019 Shaffer ................. G01R 29/10
(Continued)

FOREIGN PATENT DOCUMENTS

CN    108152602 A    6/2018
CN    109142891 A    1/2019

OTHER PUBLICATIONS

Stern, "Controlling the interactions of space variant polarization beams with rubidium vapor using external magnetic fields", 2016, OSA vol. 24, No. 5, DOI:10.1364/OE.24.004834; Optics Express 48344841 (Year: 2016).*

(Continued)

*Primary Examiner* — Darren E Wolf
(74) *Attorney, Agent, or Firm* — Office of Chief Counsel for National Institute of Standards and Technology

(57) ABSTRACT

A quantum atomic receiving antenna includes: a probe laser; a coupling laser; an atomic vapor cell that includes: a spherically-shaped or parallelepiped-shaped atomic vapor space and Rydberg antenna atoms that undergo a radiofrequency Rydberg transition to produce quantum antenna light from probe light such that an intensity of the quantum antenna light depends on an amount of radiofrequency radiation received by the Rydberg antenna atoms, the quantum antenna light including a strength, direction and polarization of the radiofrequency radiation; and a quantum antenna light detector in optical communication with the atomic vapor cell.

26 Claims, 12 Drawing Sheets

(56) References Cited

U.S. PATENT DOCUMENTS

| | | |
|---|---|---|
| 2016/0363617 A1 | 12/2016 | Anderson et al. |
| 2019/0187198 A1 | 6/2019 | Anderson et al. |
| 2020/0136727 A1* | 4/2020 | Graceffo .......... H04B 10/25753 |
| 2020/0233025 A1* | 7/2020 | Salim ................ G01R 29/0885 |
| 2020/0295838 A1* | 9/2020 | Gordon ................ H04B 10/503 |

OTHER PUBLICATIONS

Reddy, "Photonic temporal-mode multiplexing by quantum frequency conversion in a dichroic-finesse cavity", 2018, Optical Express, vol. 26, No. 21, https://doi.org/10.1364/OE.26.028091 (Year: 2018).*

Holloway, C., et al., "Sub-wavelength imaging and field mapping via electromagnetically induced transparency and Autler-Townes splitting in Rydberg atoms", Applied Physics Letters, 2014, p. 244102, vol. 104.

Holloway, C., et al., "Broadband Rydberg Atom-Based Electric-Field Probe for SI-Traceable, Self-Calibrated Measurements", IEEE Transactions on Antennas and Propagation, 2014, p. 6169-6182, vol. 62 No. 12.

Sedlacek, J., et al., "Atom-Based Vector Microwave Electrometry Using Rubidium Rydberg Atoms in a Vapor Cell", Physical Review Letters, 2013, p. 063001, vol. 111.

* cited by examiner 201.1  Sphere 201.2  Cylinder 201.3  Parallelpiped 201.4  Pyramidal (a) EVM = 2.4 % rms (b) EVM = 3.0 % rms (c) EVM = 2.6 % rms (d) EVM = 2.0 % rms (e) EVM = 2.2 % rms

QUANTUM ATOMIC RECEIVING ANTENNA AND QUANTUM SENSING OF RADIOFREQUENCY RADIATION

CROSS REFERENCE TO RELATED APPLICATIONS

The application claims priority to U.S. Provisional Patent Application Ser. No. 62/975,424, filed Feb. 12, 2020, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 975-2573; email tpo@nist.gov; reference Ser. No. 17/173,476.

BRIEF DESCRIPTION

Disclosed is a quantum atomic receiving antenna comprising: a probe laser that produces a probe light that comprises a probe frequency that is resonant with a probe electronic transition of a gaseous Rydberg antenna atom; a coupling laser that produces a coupling light that comprises a coupling frequency that is resonant with a Rydberg electronic transition of the gaseous Rydberg antenna atom; a spherical atomic vapor cell that comprises: a spherically-shaped atomic vapor space that receives a plurality of gaseous Rydberg antenna atoms; and an atomic vapor cell wall comprising a spherically symmetric interior that physically bounds the atomic vapor space to contain the gaseous Rydberg antenna atoms in the atomic vapor space, such that the atomic vapor cell: receives the probe light from the probe laser, the coupling light from the coupling laser, a radiofrequency radiation from an external radiofrequency source; and subjects the gaseous Rydberg antenna atoms to the probe light, and the gaseous Rydberg antenna atoms undergo the probe electronic transition from a first electronic state to an intermediate excited electronic state in response to receiving the probe light; subjects the gaseous Rydberg antenna atoms to the coupling light, and the gaseous Rydberg antenna atoms in the intermediate excited electronic state undergo the Rydberg electronic transition from the intermediate excited electronic state to a Rydberg electronic state in response to receiving the coupling light; subjects the gaseous Rydberg antenna atoms to the radiofrequency radiation, and the gaseous Rydberg antenna atoms in the Rydberg electronic state undergo the Radiofrequency Rydberg transition from the Rydberg electronic state to a final Rydberg electronic state in response to receiving the radiofrequency radiation; and produces quantum antenna light from the probe light in response to the gaseous Rydberg antenna atom being subjected to the probe light, the coupling light, or the radiofrequency radiation, such that an intensity of the quantum antenna light depends on an amount of radiofrequency radiation received by gaseous Rydberg antenna atoms in the Rydberg electronic state, the quantum antenna light comprising a strength, direction, and polarization of the radiofrequency radiation; and a quantum antenna light detector in optical communication with the atomic vapor cell and that receives the quantum antenna light from the atomic vapor cell and produces a quantum antenna electronic signal from the quantum antenna light, such that the quantum antenna electronic signal comprises the strength, direction, and polarization of the radiofrequency radiation, wherein an RF field distribution of the radiofrequency radiation inside the atomic vapor cell does not depend on a direction of propagation of the radiofrequency radiation with respect to receipt of the radiofrequency radiation by the atomic vapor cell.

Disclosed is a quantum atomic receiving antenna comprising: a probe laser that produces a probe light that comprises a probe frequency that is resonant with a probe electronic transition of a gaseous Rydberg antenna atom; a coupling laser that produces a coupling light that comprises a coupling frequency that is resonant with a Rydberg electronic transition of the gaseous Rydberg antenna atom; a parallelepiped atomic vapor cell that comprises: a parallelepiped-shaped atomic vapor space that receives a plurality of gaseous Rydberg antenna atoms; and an atomic vapor cell wall comprising a parallelepiped-shaped interior that physically bounds the atomic vapor space to contain the gaseous Rydberg antenna atoms in the atomic vapor space, such that the atomic vapor cell: receives the probe light from the probe laser, the coupling light from the coupling laser, a radiofrequency radiation from an external radiofrequency source; and subjects the gaseous Rydberg antenna atoms to the probe light, and the gaseous Rydberg antenna atoms undergo the probe electronic transition from a first electronic state to an intermediate excited electronic state in response to receiving the probe light; subjects the gaseous Rydberg antenna atoms to the coupling light, and the gaseous Rydberg antenna atoms in the intermediate excited electronic state undergo the Rydberg electronic transition from the intermediate excited electronic state to a Rydberg electronic state in response to receiving the coupling light; subjects the gaseous Rydberg antenna atoms to the radiofrequency radiation, and the gaseous Rydberg antenna atoms in the Rydberg electronic state undergo the Radiofrequency Rydberg transition from the Rydberg electronic state to a final Rydberg electronic state in response to receiving the radiofrequency radiation; and produces quantum antenna light from the probe light in response to the gaseous Rydberg antenna atom being subjected to the probe light, the coupling light, or the radiofrequency radiation, such that an intensity of the quantum antenna light depends on an amount of radiofrequency radiation received by gaseous Rydberg antenna atoms in the Rydberg electronic state, the quantum antenna light comprising a strength, direction, and polarization of the radiofrequency radiation; and a quantum antenna light detector in optical communication with the atomic vapor cell and that receives the quantum antenna light from the atomic vapor cell and produces a quantum antenna electronic signal from the quantum antenna light, such that the quantum antenna electronic signal comprises the strength, direction, and polarization of the radiofrequency radiation, wherein an RF field distribution of the radiofrequency radiation inside the atomic vapor cell depends on a direction of propagation of the radiofrequency radiation with respect to receipt of the radiofrequency radiation by the atomic vapor cell.

Disclosed is a process for quantum sensing of radiofrequency radiation with a quantum atomic receiving antenna, the process comprising: producing probe light that comprises a probe frequency that is resonant with a probe electronic transition of a gaseous Rydberg antenna atom; producing a coupling light that comprises a coupling frequency that is resonant with a Rydberg electronic transition of the gaseous Rydberg antenna atom; receiving, by an atomic vapor cell, a plurality of gaseous Rydberg antenna atoms in an atomic vapor space of the atomic vapor cell that is physically bounded by an atomic vapor cell wall to contain the gaseous Rydberg antenna atoms in the atomic vapor space; receiving, by the atomic vapor cell, the probe light, the coupling light, and a radiofrequency radiation; subjecting, in the atomic vapor cell, the gaseous Rydberg antenna atoms to the probe light; undergoing, by the gaseous Rydberg antenna atoms, the probe electronic transition from a first electronic state to an intermediate excited electronic state in response to receiving the probe light; subjecting, in the atomic vapor cell, the gaseous Rydberg antenna atoms to the coupling light; undergoing, by the gaseous Rydberg antenna atoms in the intermediate excited electronic state, the Rydberg electronic transition from the intermediate excited electronic state to a Rydberg electronic state in response to receiving the coupling light; subjecting, in the atomic vapor cell, the gaseous Rydberg antenna atoms to the radiofrequency radiation; undergoing, by the gaseous Rydberg antenna atoms in the Rydberg electronic state, the radiofrequency Rydberg transition from the Rydberg electronic state to a final Rydberg electronic state in response to receiving the radiofrequency radiation; producing quantum antenna light from the probe light in response to the gaseous Rydberg antenna atom being subjected to the probe light, the coupling light, or the radiofrequency radiation, such that an intensity of the quantum antenna light depends on an amount of radiofrequency radiation received by gaseous Rydberg antenna atoms in the Rydberg electronic state, wherein the quantum antenna light comprises a strength, direction, and polarization of the radiofrequency radiation; receiving, by a quantum antenna light detector in optical communication with the atomic vapor cell, the quantum antenna light from the atomic vapor cell; producing, by the quantum antenna light detector, a quantum antenna electronic signal from the quantum antenna light, such that the quantum antenna electronic signal comprises the strength, direction, and polarization of the radiofrequency radiation, wherein the atomic vapor cell comprises a spherically-shaped interior of the atomic vapor cell wall or a parallelepiped-shaped interior of the atomic vapor cell wall, such that: for the spherically-shaped interior of the atomic vapor cell, an RF field distribution of the radiofrequency radiation inside the atomic vapor cell does not depend on a direction of propagation of the radiofrequency radiation with respect to receipt of the radiofrequency radiation by the atomic vapor cell, and for the parallelepiped-shaped interior of the atomic vapor cell, the RF field distribution of the radiofrequency radiation inside the atomic vapor cell depends on a direction of propagation of the radiofrequency radiation with respect to receipt of the radiofrequency radiation by the atomic vapor cell.

BRIEF DESCRIPTION OF THE DRAWINGS

The following description cannot be considered limiting in any way. With reference to the accompanying drawings, like elements are numbered alike.

DETAILED DESCRIPTION

Figure 1:
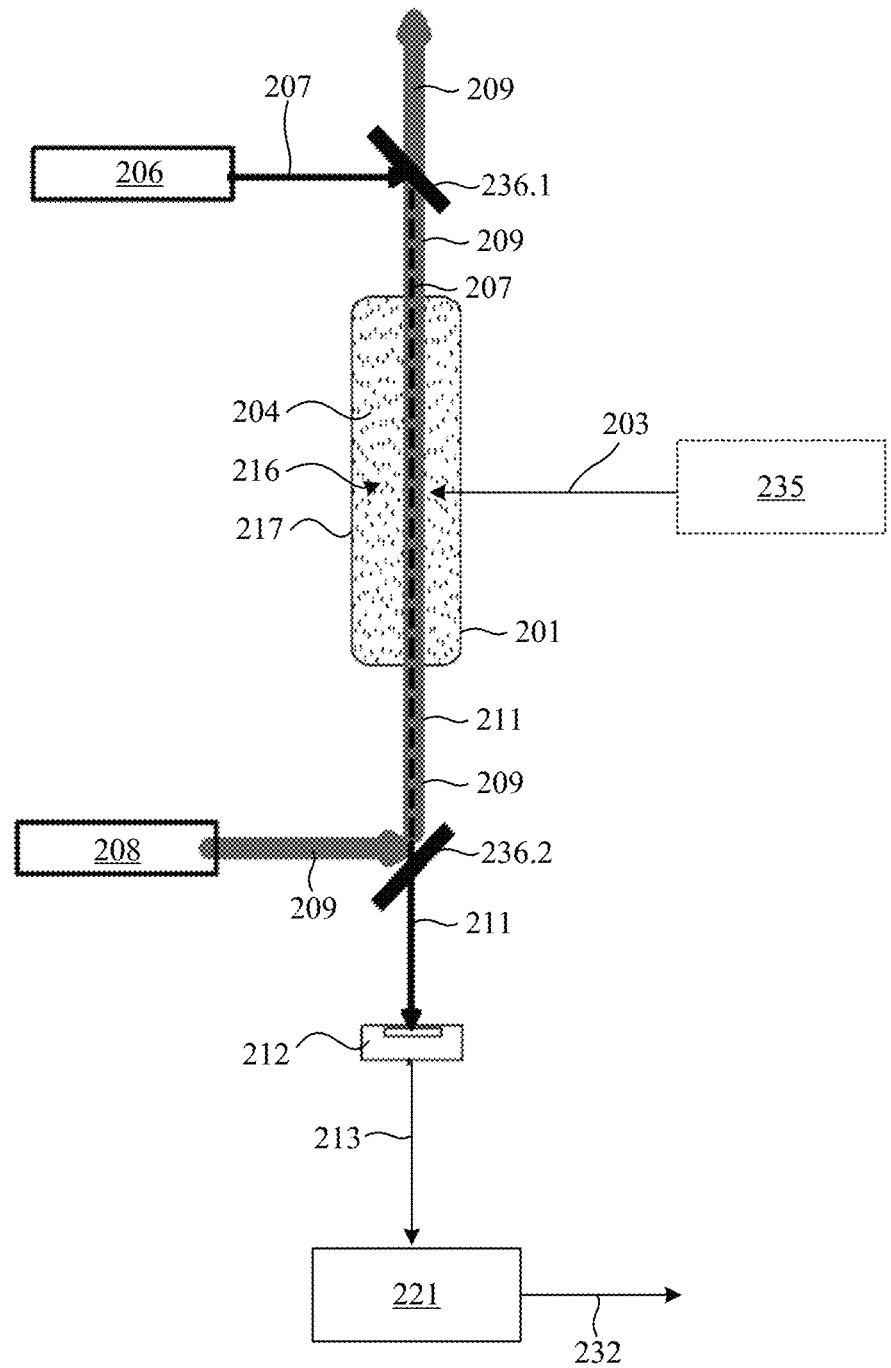
FIG. 1 shows a quantum atomic receiving antenna.

A detailed description of one or more embodiments is presented herein by way of exemplification and not limitation.

It has been discovered that a quantum atomic receiving antenna 200 provides optically excited atoms disposed in a vapor cell to sense strength, direction, and polarization of received radiofrequency (RF) radiation from hundreds of megahertz (MHz) radiofrequencies to terahertz (THz) radiofrequencies. Quantum atomic receiving antenna 200 overcomes technical deficiencies and limitations of conventional metal antennas. Quantum atomic receiving antenna 200 can be made of a dielectric material (e.g., glass) or can include a composite of dielectric material and metal. A geometry of the vapor cell provides an antenna pattern. Selection of atomic transitions provides a response of atoms in the vapor cell to different RF frequencies, RF field polarization, and sensitivity to RF field strength. Since quantum atomic receiving antenna 200 is a quantum sensor, quantum atomic receiving antenna 200 has different properties than conventional antennas and operate even though a configuration or arrangement of quantum atomic receiving antenna 200 does not involve conventional antenna design limitations under classical electromagnetic theory. Advantageously, quantum atomic receiving antenna 200 provides an isotropic receiving antenna, subwavelength antenna, or configurable all-optical beam steering antenna in an absence of an array of metallic structures connected to a network of electronic amplifiers, phase shifter, or attenuators that is present in digital beam forming or beam forming phased arrays.

Quantum atomic receiving antenna 200 provides detection of radiofrequency radiation 203 and determination of a strength, direction, and polarization of radiofrequency radiation 203. In an embodiment, with reference to FIG. 1, FIG. 2, FIG. 3, FIG. 4, and FIG. 5, quantum atomic receiving antenna 200 includes: probe laser 206 that produces probe light 207 that includes probe frequency that is resonant with probe electronic transition 223 of gaseous Rydberg antenna atom 204; coupling laser 208 that produces coupling light 209 that includes coupling frequency that is resonant with Rydberg electronic transition 226 of gaseous Rydberg antenna atom 204; a spherical atomic vapor cell 201 that includes: a spherically-shaped atomic vapor space 216 that receives a plurality of gaseous Rydberg antenna atoms 204; and atomic vapor cell wall 217 including a spherically symmetric interior that physically bounds atomic vapor space 216 to contain gaseous Rydberg antenna atoms 204 in atomic vapor space 216, such that atomic vapor cell 201: receives probe light 207 from probe laser 206, coupling light 209 from coupling laser 208, radiofrequency radiation 203 from external radiofrequency source 235; and subjects gaseous Rydberg antenna atoms 204 to probe light 207, and gaseous Rydberg antenna atoms 204 undergo probe electronic transition 223 from first electronic state 224 to intermediate excited electronic state 225 in response to receiving probe light 207; subjects gaseous Rydberg antenna atoms 204 to coupling light 209, and gaseous Rydberg antenna atoms 204 in intermediate excited electronic state 225 undergo Rydberg electronic transition 226 from intermediate excited electronic state 225 to Rydberg electronic state 227 in response to receiving coupling light 209; subjects gaseous Rydberg antenna atoms 204 to radiofrequency radiation 203, and gaseous Rydberg antenna atoms 204 in Rydberg electronic state 227 undergo Radiofrequency Rydberg transition 228 from Rydberg electronic state 227 to final Rydberg electronic state 229 in response to receiving radiofrequency radiation 203; and produces quantum antenna light 211 from probe light 207 in response to gaseous Rydberg antenna atom 204 being subjected to probe light 207, coupling light 209, or radiofrequency radiation 203, such that an intensity of quantum antenna light 211 depends on an amount of radiofrequency radiation 203 received by gaseous Rydberg antenna atoms 204 in Rydberg electronic state 227, quantum antenna light 211 including a strength, direction, and polarization of radiofrequency radiation 203; and quantum antenna light detector 212 in optical communication with atomic vapor cell 201 and that receives quantum antenna light 211 from atomic vapor cell 201 and produces quantum antenna electronic signal 213 from quantum antenna light 211, such that quantum antenna electronic signal 213 includes strength, direction, and polarization of radiofrequency radiation 203, wherein an RF field distribution of radiofrequency radiation 203 inside atomic vapor cell 201 does not depend on a direction of propagation of radiofrequency radiation 203 with respect to receipt of radiofrequency radiation 203 by atomic vapor cell 201.

In an embodiment, quantum atomic receiving antenna 200 includes probe laser 206 that produces probe light 207 that includes probe frequency that is resonant with probe electronic transition 223 of gaseous Rydberg antenna atom 204; coupling laser 208 that produces coupling light 209 that includes coupling frequency that is resonant with Rydberg electronic transition 226 of gaseous Rydberg antenna atom 204; parallelepiped atomic vapor cell 201 that includes: parallelepiped-shaped atomic vapor space 216 that receives a plurality of gaseous Rydberg antenna atoms 204; and atomic vapor cell wall 217 including a parallelepiped-shaped interior that physically bounds atomic vapor space 216 to contain gaseous Rydberg antenna atoms 204 in atomic vapor space 216, such that atomic vapor cell 201: receives probe light 207 from probe laser 206, coupling light 209 from coupling laser 208, radiofrequency radiation 203 from external radiofrequency source 235; and subjects gaseous Rydberg antenna atoms 204 to probe light 207, and gaseous Rydberg antenna atoms 204 undergo probe electronic transition 223 from first electronic state 224 to intermediate excited electronic state 225 in response to receiving probe light 207; subjects gaseous Rydberg antenna atoms 204 to coupling light 209, and gaseous Rydberg antenna atoms 204 in intermediate excited electronic state 225 undergo Rydberg electronic transition 226 from intermediate excited electronic state 225 to Rydberg electronic state 227 in response to receiving coupling light 209; subjects gaseous Rydberg antenna atoms 204 to radiofrequency radiation 203, and gaseous Rydberg antenna atoms 204 in Rydberg electronic state 227 undergo Radiofrequency Rydberg transition 228 from Rydberg electronic state 227 to final Rydberg electronic state 229 in response to receiving radiofrequency radiation 203; and produces quantum antenna light 211 from probe light 207 in response to gaseous Rydberg antenna atom 204 being subjected to probe light 207, coupling light 209, or radiofrequency radiation 203, such that an intensity of quantum antenna light 211 depends on an amount of radiofrequency radiation 203 received by gaseous Rydberg antenna atoms 204 in Rydberg electronic state 227, quantum antenna light 211 including a strength, direction, and polarization of radiofrequency radiation 203; and quantum antenna light detector 212 in optical communication with atomic vapor cell 201 and that receives quantum antenna light 211 from atomic vapor cell 201 and produces quantum antenna electronic signal 213 from quantum antenna light 211, such that quantum antenna electronic signal 213 includes the strength, direction, and polarization of radiofrequency radiation 203, wherein an RF field distribution of radiofrequency radiation 203 inside atomic vapor cell 201 depends on a direction of propagation of radiofrequency radiation 203 with respect to receipt of radiofrequency radiation 203 by atomic vapor cell 201.

In an embodiment, quantum atomic receiving antenna 200 includes first dichroic mirror 236.1 in communication with probe laser 206 and atomic vapor cell 201 and that receives probe light 207 from probe laser 206, reflects probe light 207 and communicates probe light 207 to atomic vapor cell 201, and receives coupling light 209 from atomic vapor cell 201, and communicates probe light 207 away from atomic vapor cell 201.

In an embodiment, quantum atomic receiving antenna 200 includes second dichroic mirror 236.2 in communication with coupling laser 208 and atomic vapor cell 201 and that receives coupling light 209 from coupling laser 208, reflects coupling light 209 and communicates coupling light 209 to atomic vapor cell 201, and receives quantum antenna light 211 from atomic vapor cell 201, and communicates quantum antenna light 211 to quantum antenna light detector 212. It should be appreciated that the probe or the coupling laser can be used to create quantum antenna light 211 and measured with the detector.

In an embodiment, quantum atomic receiving antenna 200 includes signal analyzer 221 in communication with quantum antenna light detector 212 and that receives quantum antenna electronic signal 213 from quantum antenna light detector 212 and produces radiofrequency detection signal 232 from quantum antenna electronic signal 213, wherein radiofrequency detection signal 232 includes strength, direction, or polarization of radiofrequency radiation 203.

In an embodiment, radiofrequency detection signal 232 includes in-phase quadrature map 222.

In an embodiment, quantum atomic receiving antenna 200 includes modulation analyzer 205 in communication with quantum antenna light detector 212 and that receives quantum antenna electronic signal 213 from quantum antenna light detector 212 and produces probe waveform 234 from quantum antenna electronic signal 213.

In an embodiment, quantum atomic receiving antenna 200 includes external radiofrequency source 235 that produces radiofrequency radiation 203, and communicates radiofrequency radiation 203 to atomic vapor cell 201.

In an embodiment, quantum atomic receiving antenna 200 external radiofrequency source 235 includes: reference radiofrequency source 218 that produces reference radiofrequency radiation 219; modulated carrier source 215 that produces modulated carrier radiation 220; power combiner 210 in communication with reference radiofrequency source 218 and modulated carrier source 215 and that receives reference radiofrequency radiation 219 from reference radiofrequency source 218 and modulated carrier radiation 220 from modulated carrier source 215, combines reference radiofrequency radiation 219 and modulated carrier radiation 220, and produces combined radiofrequency radiation 233 including reference radiofrequency radiation 219 and modulated carrier radiation 220; and radiofrequency output antenna 214 in communication with power combiner 210 and atomic vapor cell 201 and that receives combined radiofrequency radiation 233 from power combiner 210, produces radiofrequency radiation 203 from combined radiofrequency radiation 233, and communicates radiofrequency radiation 203 to atomic vapor cell 201.

Components of quantum atomic receiving antenna 200 can be made from and include various materials. Atomic vapor cell 201 receives gaseous Rydberg antenna atoms 204 that are subjected to probe light 207, coupling light 209, and radiofrequency radiation 203. Atomic vapor cell wall 217 of atomic vapor cell 201 has a selected interior shape and includes a material that transmits probe light 207, coupling light 209, radiofrequency radiation 203, and quantum antenna light 211 produced from probe light 207. In an embodiment, atomic vapor cell wall 217 includes a dielectric material that optically communicates probe light 207, coupling light 209, and quantum antenna light 211 and communicates radiofrequency radiation 203 through atomic vapor cell wall 217 to atomic vapor space 216. It is contemplated that atomic vapor cell 201 can include glass or other dielectric, or a composite of dielectric and metal and does not involve an electrically conductive circuit to operate. That is, atomic vapor cell 201 can be accessed by an all optical read out by propagation of radiation (e.g., probe light 207, coupling light 209, radiofrequency radiation 203) into atomic vapor cell 201 and propagation of quantum antenna light 211 out of atomic vapor cell 201 in absence of electrical interconnections with atomic vapor cell 201. Moreover, atomic vapor cell 201 is optically configured for various antenna patterns, multiple steerable receive beams, polarization discrimination, gain, and sensitivity. Atomic vapor cell 201 through its atomic vapor cell wall 217 can include optically transparent glass that is shaped to create a selected antenna pattern or steerable beam pattern. With single atomic vapor space 216, atomic vapor cell 201 can receive a plurality of radio frequency beams to perform functions of a multi-element antenna phased array without complex back-end circuit architecture (e.g., a phase shifter, amplifier, attenuator, and the like). It is contemplated that atomic vapor cell 201 can provide an isotropic antenna pattern. As used herein, "antenna pattern" refers to the spatial distribution and dependance of radio frequency radiation (including frequency, phase, amplitude, and polarization of radiation) corresponding to various incident trajectories of sources of radiation. Accordingly, when atomic vapor cell 201 provides the isotropic antenna pattern, such is inconsistent with classical electromagnetic theory because, classically, there is no solution to the Helmholtz equation for an isotropic radiator such, through reciprocity, an isotropic receive antenna is not classically achievable. Such classical law does not apply to atomic vapor cell 201 because gaseous Rydberg antenna atoms 204 are individual nano-sized quantum antennas that are sensitive in all directions to radiofrequency radiation 203 and create an isotropic receiver. Atomic vapor cell 201 can be many times smaller than an RF wavelength, and specifically over 1000 times smaller of an RF wavelength, which breaks a law of classical electromagnetics known as the Chu-Harrington Limit.

Probe light 207 and coupling light 209 independently can have various optical properties to selectively interact with gaseous Rydberg antenna atoms 204. A beam width, polarization, wavelength, or intensity of light (probe light 207, coupling light 209) dictates the atomic transition of gaseous Rydberg antenna atom 204 that is excited. Tuning wavelength of light (probe light 207, coupling light 209) and thus atomic state manifolds change RF frequency of radiofrequency radiation 203 that gaseous Rydberg antenna atom 204 respond to and RF frequency that quantum atomic receiving antenna 200 responds to. Changing polarization of light (probe light 207, coupling light 209) changes the atomic state coupling between different momentum transitions and affects sensitivity to different RF polarizations of radiofrequency radiation 203. Changing intensity of light (probe light 207, coupling light 209) affects sensitivity of gaseous Rydberg antenna atom 204 to different RF field strengths of radiofrequency radiation 203 by altering a width of electromagnetically induced transparency (EIT) and Autler-Townes peaks of gaseous Rydberg antenna atom 204. A wavelength of probe light 207 can be from 1 nm to 20,000 nm, specifically from 100 nm to 900 nm, and more specifically from 300 nm to 900 nm. A wavelength of coupling light 209 can be from 1 nm to 20,000 nm, specifically from 100 nm to 900 nm, and more specifically from 300 nm to 900 nm. A frequency of radiofrequency radiation 203 can be from 1 MHz to 10 THz, specifically from 10 MHz to 10 THz, and more specifically from 500 MHz to 1 THz. A wavelength of quantum antenna light 211 can be from 1 nm to 20,000 nm, specifically from 100 nm to 900 nm, and more specifically from 300 nm to 800 nm.

It should be appreciated that properties of quantum atomic receiving antenna 200 can be selected through a combination of vapor cell construction such as geometrical shape; particular atomic states subjected by probe light 207, coupling light 209, and radiofrequency radiation 203 or species of atoms in atomic vapor cell 201; or optical properties of probe light 207 or coupling light 209 that excite or interrogate quantum states of gaseous Rydberg antenna atom 204. As a result, quantum atomic receiving antenna 200 is fundamentally linked to Planks constant, an atomic dipole moment, an atomic time scale, or SI units.

Figure 7:
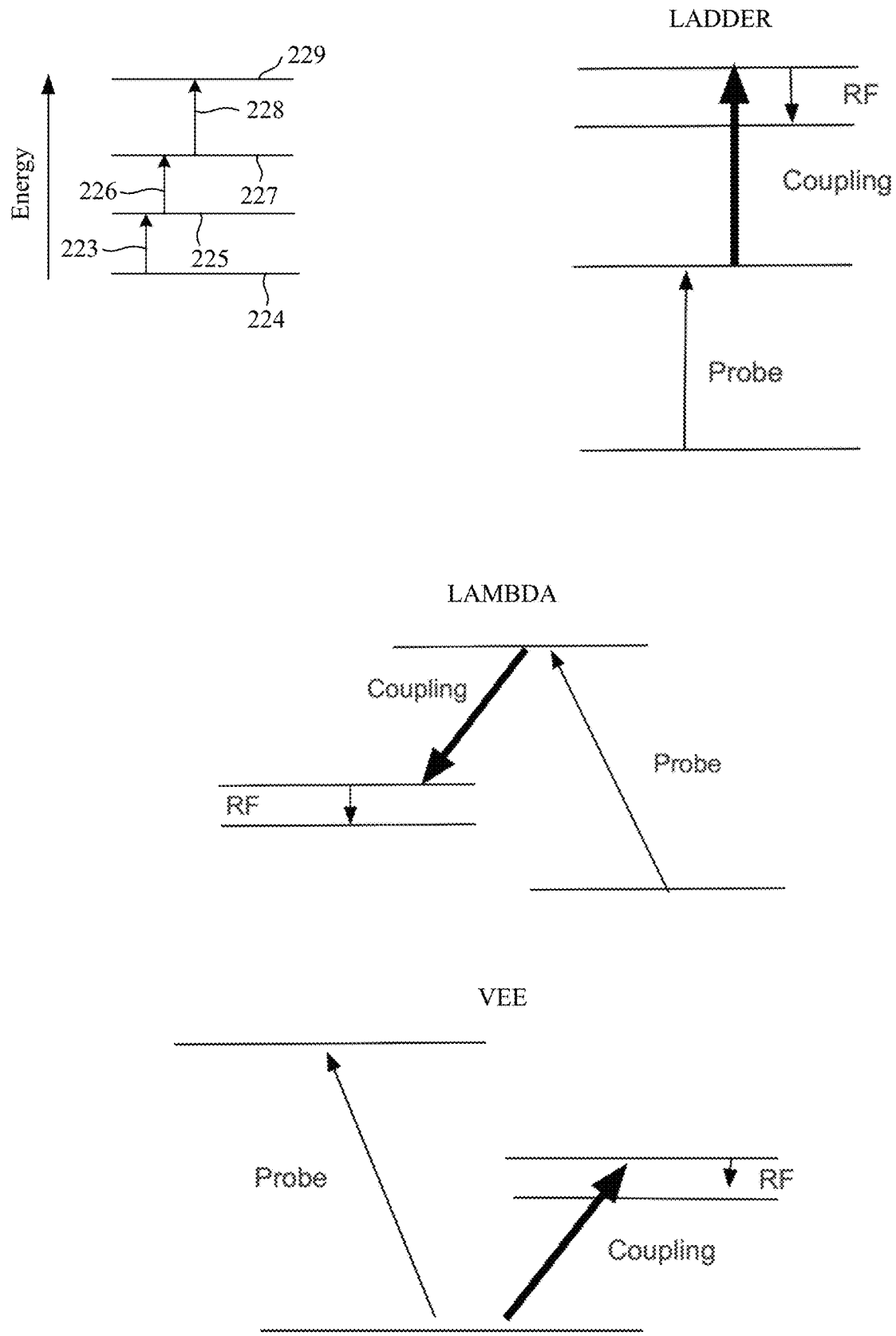
FIG. 7 shows an energy level diagram for a gaseous Rydberg antenna atom.

Gaseous Rydberg antenna atom 204 provides an electronic structure that provides optically accessible Rydberg states by optical absorption of probe light 207 or coupling light 209 with electronic transitions, e.g., shown in FIG. 7, and can include ladder, lambda, and vee type of atomic energy level structure schemes. Exemplary gaseous Rydberg antenna atoms 204 include alkali metal atoms such as cesium. A choice of atomic electronic states provides discrimination of different RF electric field polarizations of radiofrequency radiation 203. S-to-P electronic transitions can be less sensitive to different RF polarizations. D-to-P electronic transitions can be sensitive to different RF polarizations of radiofrequency radiation 203. Choice of atomic electronic states dictate what RF frequency, e.g., from 500 MHz to 1 THz, to which quantum atomic receiving antenna 200 is responsive for detection of radiofrequency radiation 203.

With gaseous Rydberg antenna atom 204 disposed in atomic vapor cell 201, the material of construction of atomic vapor cell 201, geometry or dimension of atomic vapor cell 201 provides RF modes within atomic vapor cell 201. As a result, a distribution of an RF electric field in atomic vapor cell 201 is provided by its geometry and material. Accordingly, atomic vapor cell 201 can have an arbitrary shape to provide selectively tailored RF modes in atomic vapor cell 201. Exemplary shapes include spherical, cylindrical, parallelepiped, pyramidal, and the like as shown in FIG. 3, FIG. 4, FIG. 5, and FIG. 6.

Figure 3:
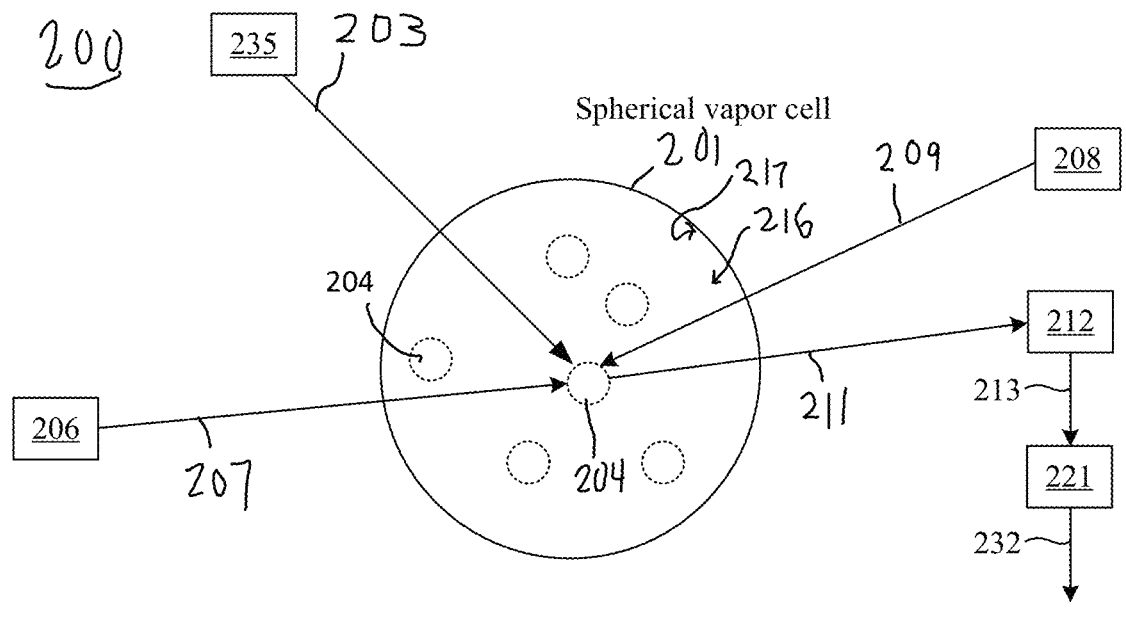
FIG. 3 shows a quantum atomic receiving antenna.
Figure 4:
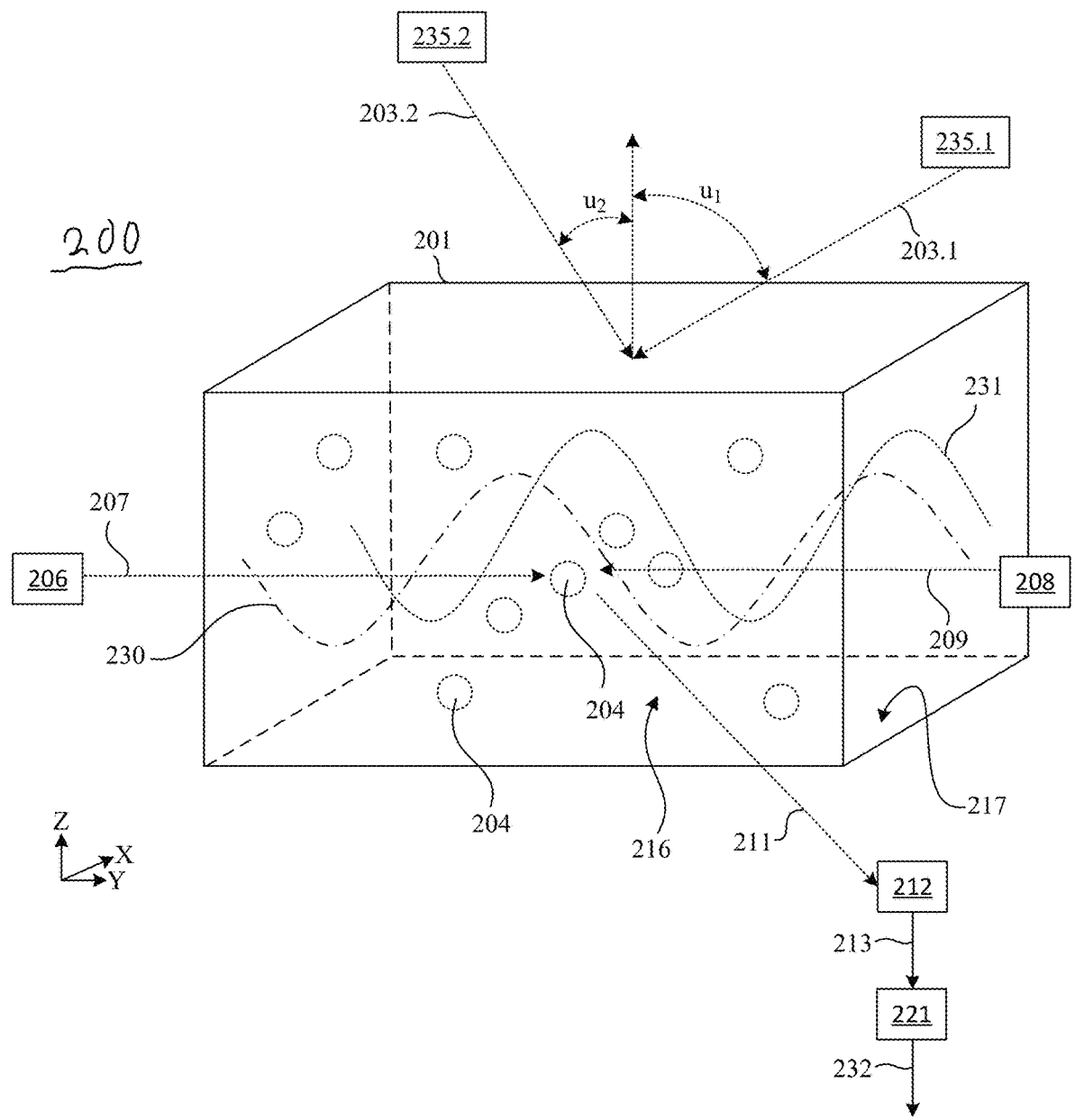
FIG. 4 shows a quantum atomic receiving antenna.
Figure 5:
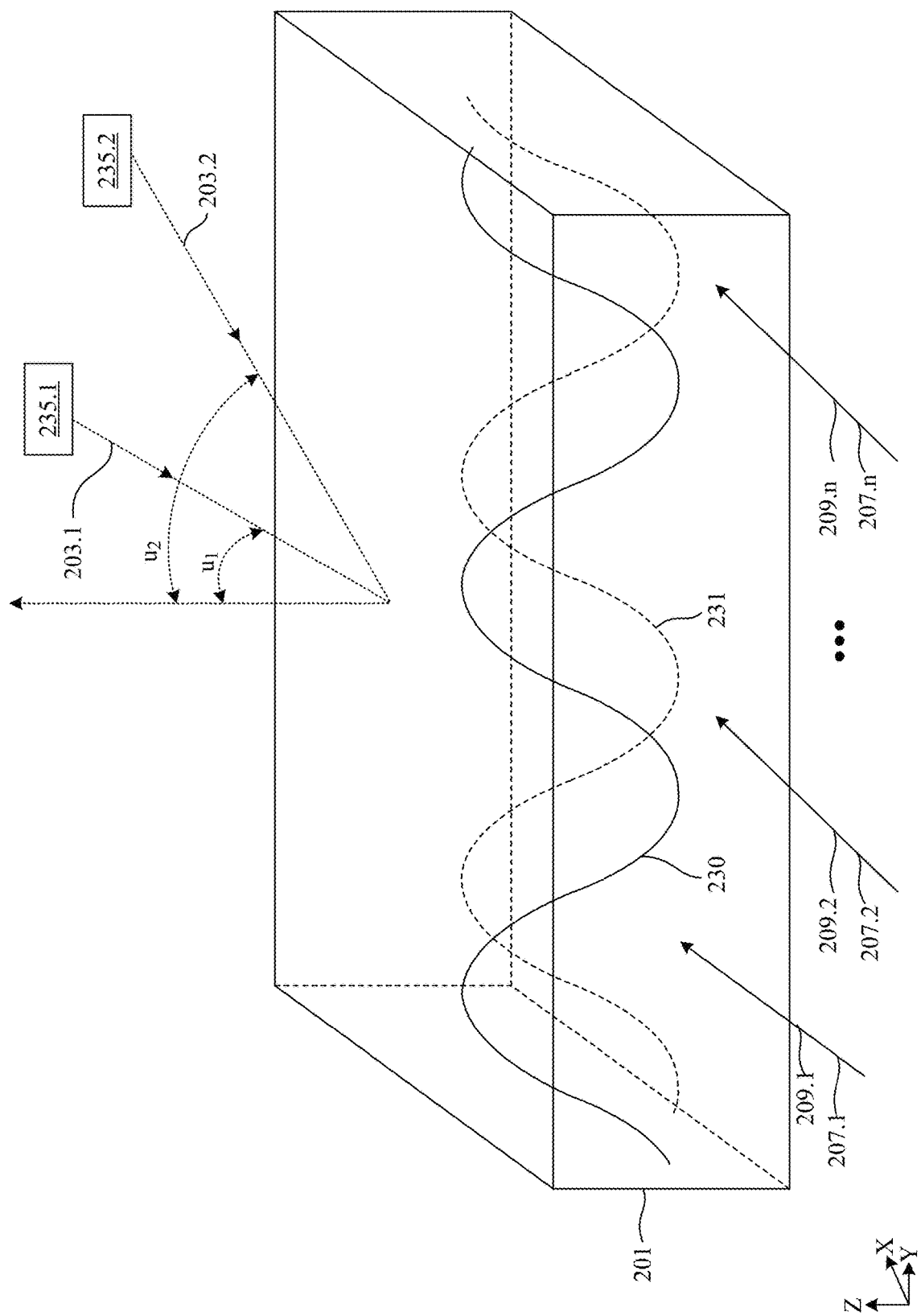
FIG. 5 shows a quantum atomic receiving antenna.
Figure 6:
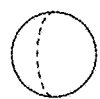
FIG. 6 shows a plurality of atomic vapor cells.
Figure 6:
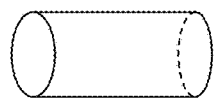
Figure 6:
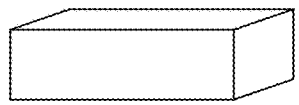
Figure 6:
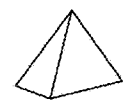

An isotropic quantum atomic receiving antenna 200 can include a spherical atomic vapor cell 201 as shown in FIG. 3 and FIG. 6. A multiple beam steering quantum atomic receiving antenna 200 can include a parallelpiped atomic vapor cell 201 as shown in FIG. 4, FIG. 5, and FIG. 6. Because gaseous Rydberg antenna atoms 204 are individually isotropic receive antennas, by disposing gaseous Rydberg antenna atoms 204 in spherical vapor cell 201, electromagnetic boundary conditions set by atomic vapor cell 201 are symmetric, and the RF field distribution inside atomic vapor cell 201 is symmetric with respect to the direction of radiofrequency radiation 203 with respect to atomic vapor cell 201 so that atomic vapor cell 201 is an isotropic receive antenna.

A non-symmetrically shaped atomic vapor cell 201, such as parallelpiped atomic vapor cell 201 shown in FIG. 4, FIG. 5, or FIG. 6, breaks spherical symmetry and provides a complex RF field mode structure in atomic vapor cell 201. The RF mode structure can shift depending on a direction of incident RF field of radiofrequency radiation 203. By measuring the RF field at N-number of points along radiofrequency radiation 203, the direction of radiofrequency radiation 203 incident on atomic vapor cell 201 can be determined. A number of lasers or locations measured along atomic vapor cell 201 determines discrimination of directions and number of received radiofrequency radiation 203. A network of integrated optical waveguides can be disposed on atomic vapor cell 201, e.g., through etching or patterning such on atomic vapor cell 201, such that laser beams traverse atomic vapor cell 201 at different locations of atomic vapor cell 201.

With reference to FIG. 4, first external radiofrequency source 235.1 impinges atomic vapor cell 201 at first angle u1, and second external radiofrequency source 235.2 impinges atomic vapor cell 201 at send angle u2. First angle u1 and second angle u2 independently can be selected so that the direction, frequency, amplitude, pase and polarization of radiation source in direction of u1 and u2 can be determined. It is contemplated that first angle u1 and second angle u2 independently can be from 0.1° to 89.9°, specifically from 1° to 85°, and more specifically from 5° to 60°.

With reference to FIG. 5, first external radiofrequency source 235.1 impinges atomic vapor cell 201 at first angle u1, and second external radiofrequency source 235.2 impinges atomic vapor cell 201 at send angle u2. A pair of probe 207 and coupling 209 beams are used to interogate the radio frequency mode structure inside the vapor cell and there by determine first angle u1 and second angle u2. For instance using a pair of probe 207 and coupling lasers 209 can be used to measure at two different locations of the vapor cell 201 the radio frequency mode inside the vapor cell 201. A comparison of measurements at these locations can be used to determine the direction, frequency, amplitude, and phase and polarization of radiation source in direction of u1 and u2. First angle u1 and second angle u2 independently can be selected so that the direction, frequency, amplitude, phase and polarization of radiation source in direction of u1 and u2 can be determined. It is contemplated that first angle u1 and second angle u2 independently can be from 0.1° to 89.9°, specifically from 1° to 85°, and more specifically from 5° to 60°.

Quantum antenna light detector 212 receives quantum antenna light 211 from atomic vapor cell 201. Quantum antenna light detector 212 can be a photodector such as a photodiode and the like with detection of light that transduces production of quantum antenna electronic signal 213. Quantum antenna electronic signal 213 includes information about polarization, intensity, and the like of radiofrequency radiation 203.

Signal analyzer 221 receives quantum antenna electronic signal 213 from quantum antenna light detector 212 and produces radiofrequency detection signal 232 from quantum antenna electronic signal 213. Here, signal analyzer 221 can include an oscilloscope, lock-in amplifier, vector signal analyzer to measurer the amplitude, phase, modulation format of the detection signal 232. In an embodiment, signal analyzer 221 includes a vector signal analyzer. In an embodiment, signal analyzer 221 is a vector signal analyzer that receives quantum antenna electronic signal 213 and produces in-phase quadrature map 222 from quantum antenna electronic signal 213.

Radiofrequency detection signal 232 includes information about polarization, intensity, and the like of radiofrequency radiation 203. Moreover, radiofrequency detection signal 232 can include phase, frequency, polarization, amplitude, modulation, modulation format, and angle of incidence characteristics of radio frequency radiation 203 to provide a measurement and to characterize radio frequency radiation 203 and can be an optical signal, an electrical signal. In an embodiment, radiofrequency detection signal 232 includes the voltage output signal from a photodiode detector.

Figure 2:
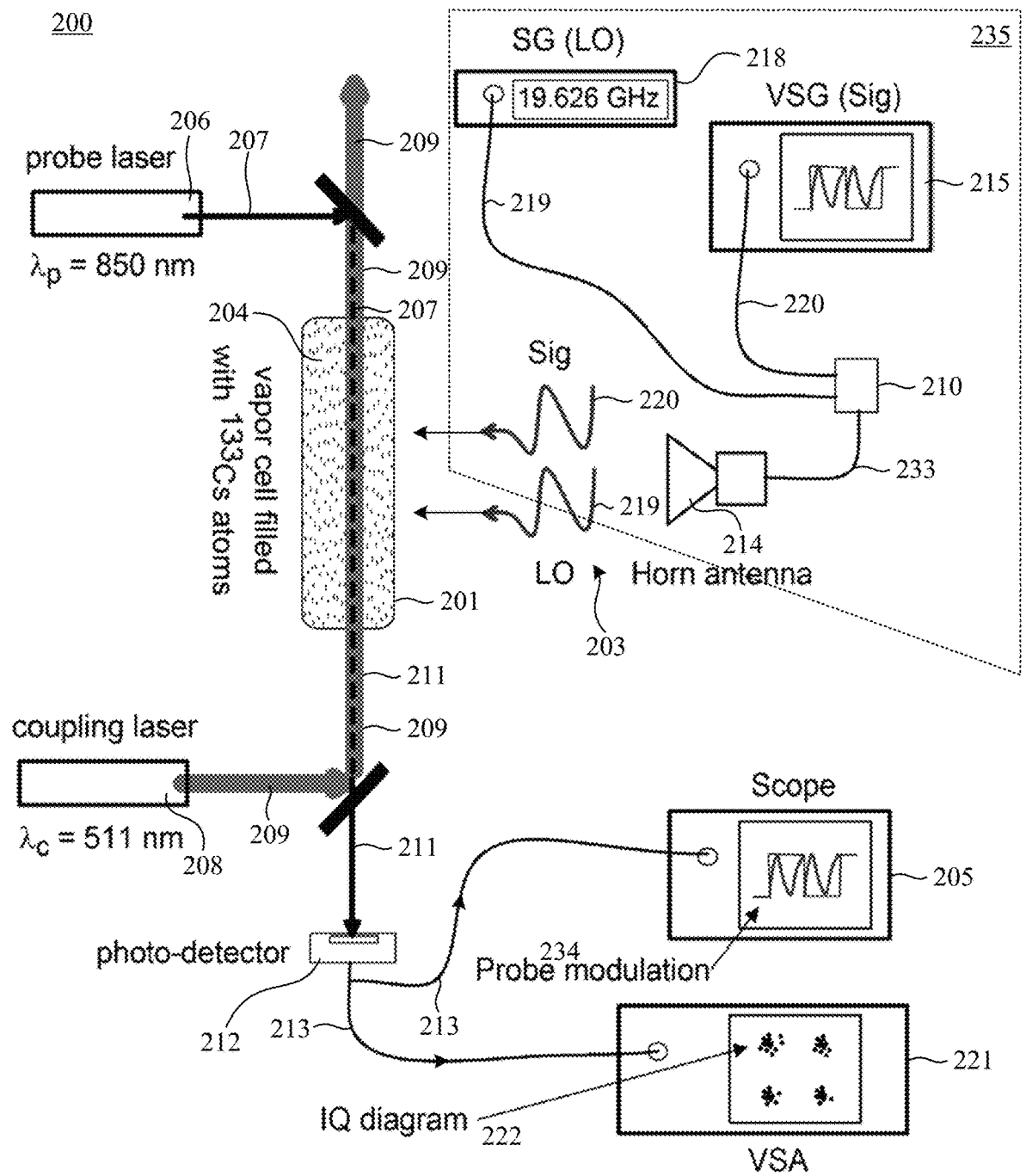
FIG. 2 shows a quantum atomic receiving antenna.

As shown in FIG. 2, modulation analyzer 205 can receive quantum antenna electronic signal 213 from quantum antenna light detector 212 to produce, e.g., probe waveform 234 from quantum antenna electronic signal 213. Modulation analyzer 205 can be an oscilloscope for electrical waveform analysis.

In an embodiment, with reference to FIG. 2, external radiofrequency source 235 can include reference radiofrequency source 218, e.g., a low frequency RF source, that produces reference radiofrequency radiation 219 and a modulated carrier source 215 such as vector signal generator that produces modulated carrier radiation 220. Reference radiofrequency radiation 219 and modulated carrier radiation 220 can be combined by power combiner 210 as combined radiofrequency radiation 233 that is received by radiofrequency output antenna 214. Radiofrequency output antenna 214 communicates reference radiofrequency radiation 219 and reference radiofrequency radiation 219 as radiofrequency radiation 203 to atomic vapor cell 201. In an embodiment, radiofrequency radiation 203 includes modulated carrier radiation 220 and reference radiofrequency radiation 219, wherein radio transition frequency is resonant with radiofrequency Rydberg transition 228 of gaseous Rydberg antenna atoms 204.

Quantum atomic receiving antenna 200 can be made in various ways. It should be appreciated that quantum atomic receiving antenna 200 includes a number of optical, electrical, or mechanical components, wherein such components can be interconnected and placed in communication (e.g., optical communication, electrical communication, fluid communication, mechanical communication, and the like) by physical, chemical, optical, or free-space interconnects. The components can be disposed on mounts that can be disposed on a bulkhead for alignment or physical compartmentalization. As a result, quantum atomic receiving antenna 200 can be disposed in a terrestrial environment or space environment.

In an embodiment, a process for making quantum atomic receiving antenna 200 includes: disposing atomic vapor cell 201 in optical communication with probe laser 206 and coupling laser 208; receiving gaseous Rydberg antenna atoms 204 in atomic vapor cell 201; disposing gaseous Rydberg antenna atom 204 in optical communication with quantum antenna light detector 212; and connecting quantum antenna light detector 212 to signal analyzer 221. external radiofrequency source 235 can be placed in radiofrequency communication with atomic vapor cell 201.

Quantum atomic receiving antenna 200 has numerous advantageous and unexpected benefits and uses. In an embodiment, a process for quantum sensing of radiofrequency radiation with quantum atomic receiving antenna 200 includes: producing probe light 207 that includes probe frequency that is resonant with probe electronic transition 223 of gaseous Rydberg antenna atom 204, e.g., by a frequency tunable and frequency stabilized optical source such as a frequency tunable laser; producing coupling light 209 that includes a coupling frequency that is resonant with Rydberg electronic transition 226 of gaseous Rydberg antenna atom 204, e.g., by a frequency tunable and frequency stabilized optical source such as a frequency tunable laser; receiving, by atomic vapor cell 201, a plurality of gaseous Rydberg antenna atoms 204 in atomic vapor space 216 of atomic vapor cell 201, wherein atomic vapor space 216 is physically bounded by atomic vapor cell wall 217 to contain the gaseous Rydberg antenna atoms 204 in atomic vapor space 216; receiving, by atomic vapor cell 201, probe light 207, coupling light 209, and radiofrequency radiation 203, e.g., by way of optical components such as mirrors, lens, and polarizers to align and properly focus probe light 207 and coupling light 209 with atomic vapor cell 201; subjecting, in atomic vapor cell 201, gaseous Rydberg antenna atoms 204 to probe light 207; undergoing, by gaseous Rydberg antenna atoms 204, probe electronic transition 223 from first electronic state 224 to intermediate excited electronic state 225 in response to receiving probe light 207; subjecting, in atomic vapor cell 201, gaseous Rydberg antenna atoms 204 to coupling light 209, e.g., by optical components such as mirrors, lens, and polarizers to align and properly focus coupling light 209; undergoing, by gaseous Rydberg antenna atoms 204 in intermediate excited electronic state 225, Rydberg electronic transition 226 from intermediate excited electronic state 225 to Rydberg electronic state 227 in response to receiving coupling light 209 by tuning coupling light 209 frequency to be tuned to the appropriate electronic state 227 transition frequency; subjecting, in atomic vapor cell 201, gaseous Rydberg antenna atoms 204 to radiofrequency radiation 203; undergoing, by gaseous Rydberg antenna atoms 204 in Rydberg electronic state 227, radiofrequency Rydberg transition 228 from Rydberg electronic state 227 to final Rydberg electronic state 229 in response to receiving radiofrequency radiation 203; producing quantum antenna light 211 from probe light 207 in response to gaseous Rydberg antenna atom 204 being subjected to probe light 207, coupling light 209, or the radiofrequency radiation 203, such that an intensity of quantum antenna light 211 depends on an amount of radiofrequency radiation 203 received by gaseous Rydberg antenna atoms 204 in Rydberg electronic state 227, wherein quantum antenna light 211 includes a strength, direction, and polarization of radiofrequency radiation 203; receiving, by quantum antenna light detector 212 in optical communication with atomic vapor cell 201, quantum antenna light 211 from atomic vapor cell 201; producing, by quantum antenna light detector 212, quantum antenna electronic signal 213 from quantum antenna light 211, such that quantum antenna electronic signal 213 includes the strength, direction, and polarization of radiofrequency radiation 203, wherein atomic vapor cell 201 includes a spherically-shaped interior of atomic vapor cell wall 217 or a parallelepiped-shaped interior of atomic vapor cell wall 217, such that: for the spherically-shaped interior of atomic vapor cell 201, an RF field distribution of radiofrequency radiation 203 at the center of atomic vapor cell 201 does not depend on a direction of propagation of radiofrequency radiation 203 with respect to receipt of radiofrequency radiation 203 by atomic vapor cell 201, and for the parallelepiped-shaped interior of atomic vapor cell 201, the RF field distribution of radiofrequency radiation 203 inside atomic vapor cell 201 can have a more complex mode structure and depends on a direction of propagation of radiofrequency radiation 203 with respect to receipt of radiofrequency radiation 203 by atomic vapor cell 201.

In an embodiment, the process for quantum sensing of radiofrequency radiation includes receiving, by signal analyzer 221 in communication with quantum antenna light detector 212, quantum antenna electronic signal 213 from quantum antenna light detector 212; and producing radiofrequency detection signal 232 from quantum antenna electronic signal 213, wherein radiofrequency detection signal 232 includes the strength, direction, or polarization of radiofrequency radiation 203.

In an embodiment, the process for quantum sensing of radiofrequency radiation includes receiving, by modulation analyzer 205 in communication with quantum antenna light detector 212, the quantum antenna electronic signal 213 from the quantum antenna light detector 212; and producing probe waveform 234 from quantum antenna electronic signal 213.

In an embodiment, the process for quantum sensing of radiofrequency radiation includes producing reference radiofrequency radiation 219 by an appropriate radiofrequency signal generator and emitter such as a horn antenna connected to a radiofrequency waveform generator; producing modulated carrier radiation 220 by interference phenomena of radiofrequency radiation 203 and reference radiofrequency radiation 219; combining reference radiofrequency radiation 219 and modulated carrier radiation 220 as radiofrequency radiation 203; and communicating radiofrequency radiation 203 to atomic vapor cell 201.

Quantum atomic receiving antenna 200 and processes disclosed herein have numerous beneficial uses, including that such: can be significantly smaller than wavelength of radiofrequency radiation 203 and below the Chu Limit; have less influence and perturbation on the radiofrequency radiation 203 since it can be made of dielectric (such as glass) rather than metal as a classical antenna would be constructed from; can have an isotropic antenna pattern, can receive radiation over a very large radiofrequency range and not be restricted to discrete radio frequency bands; can detect radiofrequency radiation 203 sources from many directions without the need for sophisticated integrated electronics such as in phased arrays, can have complex antenna patterns that can be engineered by judicious choice of vapor cell 201 geometry. Advantageously, quantum atomic receiving antenna 200 overcomes limitations of technical deficiencies of conventional technology such as operating in an absence of complex electronic components such as radiofrequency phase shifters and complex arrays of small antennas in order to detect radiofrequency radiation 203 from different angles of arrival, and can have an isotropic antenna pattern that conventional devices such as classical antennas cannot obtain.

The articles and processes herein are illustrated further by the following Example, which is non-limiting.

EXAMPLE

Detecting and receiving phase-modulated signals with a rydberg atom-based receiver.

Rydberg atom-based receivers detect communication signals and provide a modulation scheme for transmitting data by phase modulation of a carrier wave. Rydberg atom communication receivers are advantageous over conventional technology for receiving phase-modulated signals and detect and receive data by modulation of radiation. Rydberg atoms have one or more electrons excited to a very high principal quantum number n. Rydberg atoms have large dipole moments that scale as $n^2$, which make them useful for electric (E) field sensors. Rydberg states of an alkali atomic vapor in glass cells for radio frequency (RF) E-field strength and power sensors can include electromagnetically induced transparency (EIT) for E-field sensing, performed when an RF field is either on-resonance of a Rydberg transition, using Autler-Townes (AT) splitting or off-resonance using ac Stark shifts. This Rydberg atom-based sensor is a compact quantum-based receiver-antenna for communication applications to detect and receive modulated signals. The quantum-based E-field sensor can be used communications for phase-modulation reception. Quantum atomic receiving antenna 200 as a Rydberg atom-based mixer (shown in FIG. 2) detects a phase-modulated RF carrier and detects and receives BPSK, QPSK, and QAM signals. Measuring phase of a CW field does not necessarily involve detection and receipt of data for a phase-modulated communication signal. But quantum atomic receiving antenna 200 detects and receives data from different phase-modulation schemes that are used in communication systems.

With regard to measuring phase of a signal and receiving and symbols in a communication signal, a modulation scheme for digital communications is phase-shift keying (PSK) using BPSK and QPSK. In these modulation schemes, data are transmitted by changing (or modulating) the phase of the CW carrier. BPSK uses two different phase states to transmit data, in which the carrier frequency phase is changed between 0° and 180°. Each phase state represents one transmitted symbol, and each symbol is mapped into bits "1" or "0." QPSK is a type of PSK, where each transmitted symbol (or phase state) is mapped into two bits. This is done by choosing one of four possible phases applied to a CW carrier, e.g., 45° (binary state "00"), 135° (binary state "01"), -45° (binary state "10"), and -135° (binary state "11"). Using the phase and the amplitude, this idea is extended to QAM, where 16QAM corresponds to 16 phase and amplitude states; each phase state is a transmitted symbol (each symbol corresponds to 4 bits, "0000," "1000," "1100," etc.). Continuing this, ($2^n$) QAM corresponds to $2^n$ phase and amplitude states; each phase state is a transmitted symbol (each symbol corresponds to n bits). Thus, to receive BPSK, QPSK, and QAM signals, one needs to measure and detect the phase and amplitude of the CW carrier. The Rydberg atom-based mixer allows measurement of phase and amplitude of a carrier, and we use this approach to receive BPSK, QPSK, 16QAM, 32QAM, and 64QAM modulated signals. A reference RF field (labeled "LO" in FIG. 2) on-resonance with the Rydberg atom transition acts as a local oscillator (LO). The "LO" field causes the EIT/AT effect in the Rydberg atoms, which is used to down-convert a second co-polarized RF field. This second field is detuned from the "LO" field and is the digital modulated carrier (labeled "SIG" in FIG. 2). The frequency difference between the LO and the SIG is an intermediate frequency (IF), and the IF is detected by optically probing the Rydberg atoms (see FIG. 2). The phase of the IF signal corresponds directly to the relative phase between the "LO" and "SIG" signals. In effect, the atom-based mixer does all the downconversion of the "SIG" and the "LO," and a direct read-out of the phase of SIG is obtained by the probe laser propagating through the atomic vapor. By measuring the relative phase shift of the IF signal (via a photodetector), we can determine the phase states of BPSK, QPSK, and QAM signals.

The EIT/AT technique involves monitoring the transmission of a "probe" laser through the vapor cell. A second laser ("coupling" laser) establishes a coherence in the atomic states and enhances the probe transmission through the atoms. An applied RF field (the LO field in our case) alters the susceptibility of the atomic vapor, which results in a change in the probe laser transmission. Presence of both LO and SIG fields creates a beat note, and the beat note results in AM of the probe transmission, where the amplitude of the probe transmission varies as $\cos(2\pi f_{IF} t + \Delta\varphi)$ (where $f_{IF}$ is the frequency of the IF field and $\Delta\varphi$ is the phase difference between the LO and SIG fields). This AM of the probe laser transmission can be detected with a photodetector and used to determine the phase of the SIG signal. For a pure AM or FM carrier, the Rydberg atoms automatically demodulate the carrier, and output of the photodetector gives a direct read-out of the baseband signal (the information being transmitted). For a phase-modulated carrier, the Rydberg atoms automatically downconvert the carrier to the IF, which contains the phase states of the different phase-modulation schemes.

With reference to the quantum atomic receiving antenna shown in FIG. 2, to generate EIT, we use cesium ($^{133}$Cs) atoms. The probe laser is tuned to the D2 transition for $^{133}$Cs ($6S_{1/2}$-$6P_{3/2}$ or wavelength of $\lambda p$=850.53 nm) focused to a full-width at half-maximum (FWHM) of 425 μm, with a power of 41.2 μW. To produce an EIT signal, we couple to the $^{133}$Cs $6P_{3/2}$-$34D_{5/2}$ states by applying a counterpropagating coupling laser at $\lambda c$=511.1480 nm with a power of 48.7 mW, focused to an FWHM of 620 μm. We use a signal generator (SG) to apply an LO field at 19.626 GHz to couple states $34D_{5/2}$ and $35P_{3/2}$. While we use 19.626 GHz, this approach can work at carriers at least from 100 MHz to 1 THz. To generate the modulated SIG field, we use a vector signal generator (VSG). The VSG applies a given digital modulation scheme AM and/or phase to a CW carrier. We set the frequency of the CW SIG field to 19.626 GHz+$f_{IF}$ (where the $f_{IF}$ is changed during these experiments). The outputs from the SG and the VSG were connected to a standard gain horn antenna via a power combiner. The output of the photodetector was connected to the input of a vector signal analyzer (VSA). The Rydberg atoms automatically downconvert the modulated carrier to the IF (the amplitude of the probe laser transmission), and the signal analyzer can detect the phase change of the IF signal and, hence, detect the phase state of the signal. In effect, the VSA detects the phase state of a downconverted signal and, hence, recovers the phase state of the modulated carrier. The output of the photodetector was also sent to an oscilloscope.

Figure 8:
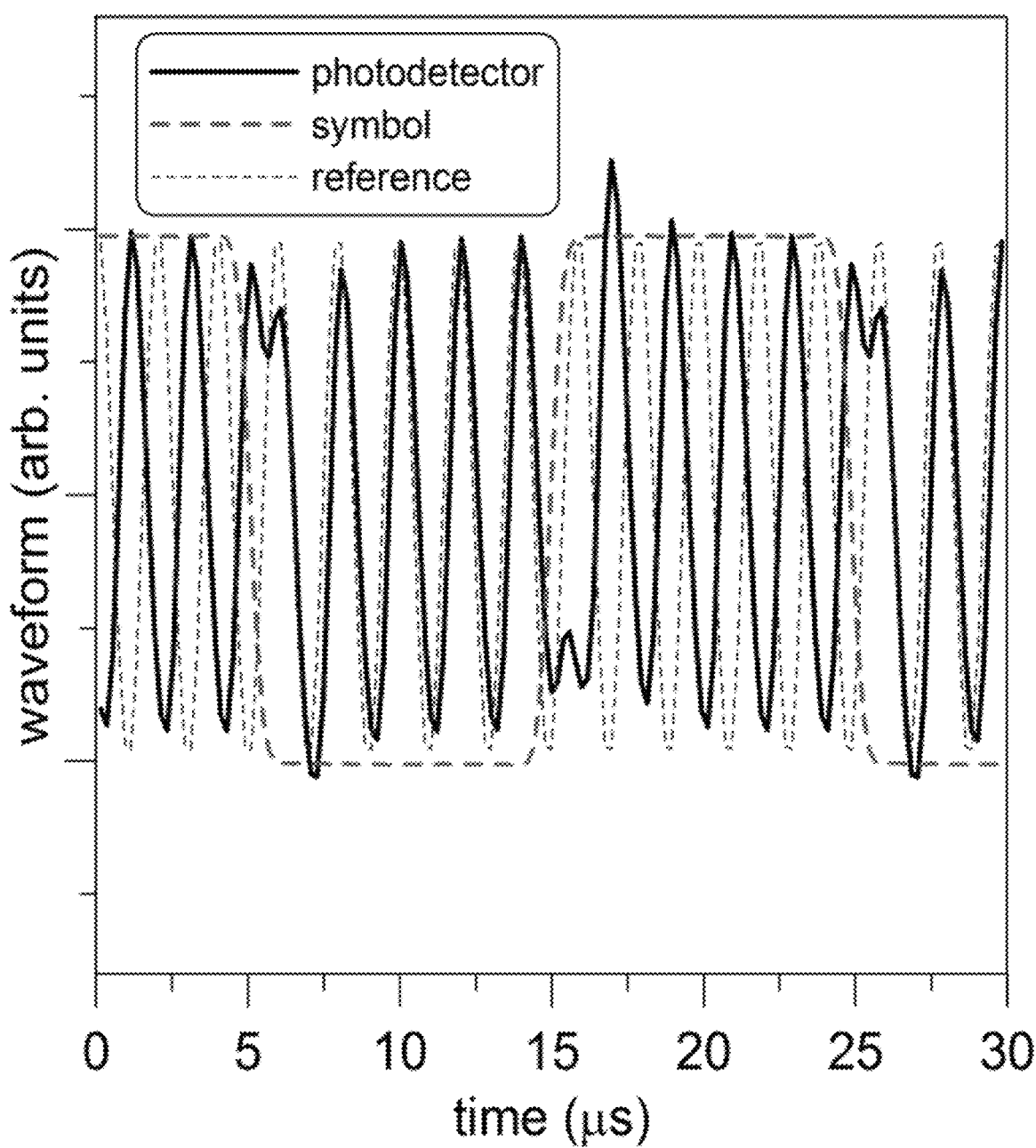
FIG. 8 shows signal detected on a photodetector as measured on an oscilloscope for BPSK modulation for fIF=500 kHz and symbol rate of 100 kSym/s, wherein a symbol period was 10 s.

With respect to receiving BPSK signal, FIG. 8 shows the signal detected on the photodetector (measured on the oscilloscope) for a BPSK modulation for $f_{IF}$=500 kHz and symbol period of 1 s (i.e., a symbol rate of 1 kSym/s or 1 kb/s). Also, in the figure, there is a reference signal. Comparing the reference signal with the photodetector signal shows the phase shift in the signal when the symbol state changes (represented by the square wave in the figure). Furthermore, comparing the phase of the beat-note (or photodetector) signal to the reference signal in each symbol frame gives the phase of the CW carrier in that symbol, i.e., the phase state of the CW in the particular symbol.

Figure 9:
FIG. 9 shows measured IQ diagrams: (a) BPSK, (b) QPSK, (c) 16QAM, (d) 32QAM, and (e) 64QAM, wherein an EVM for each case is indicted, and a bandwidth of the photodetector and VSA are 10 MHz.
Figure 9:
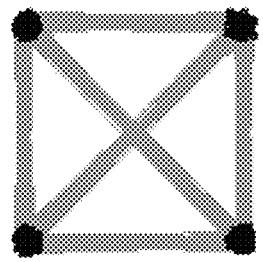
Figure 9:
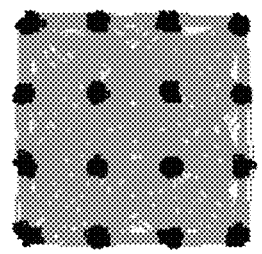
Figure 9:
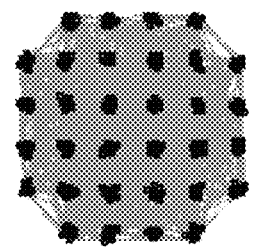
Figure 9:
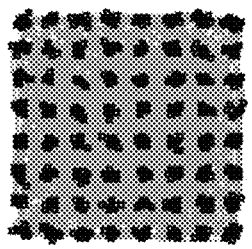
Figure 10:
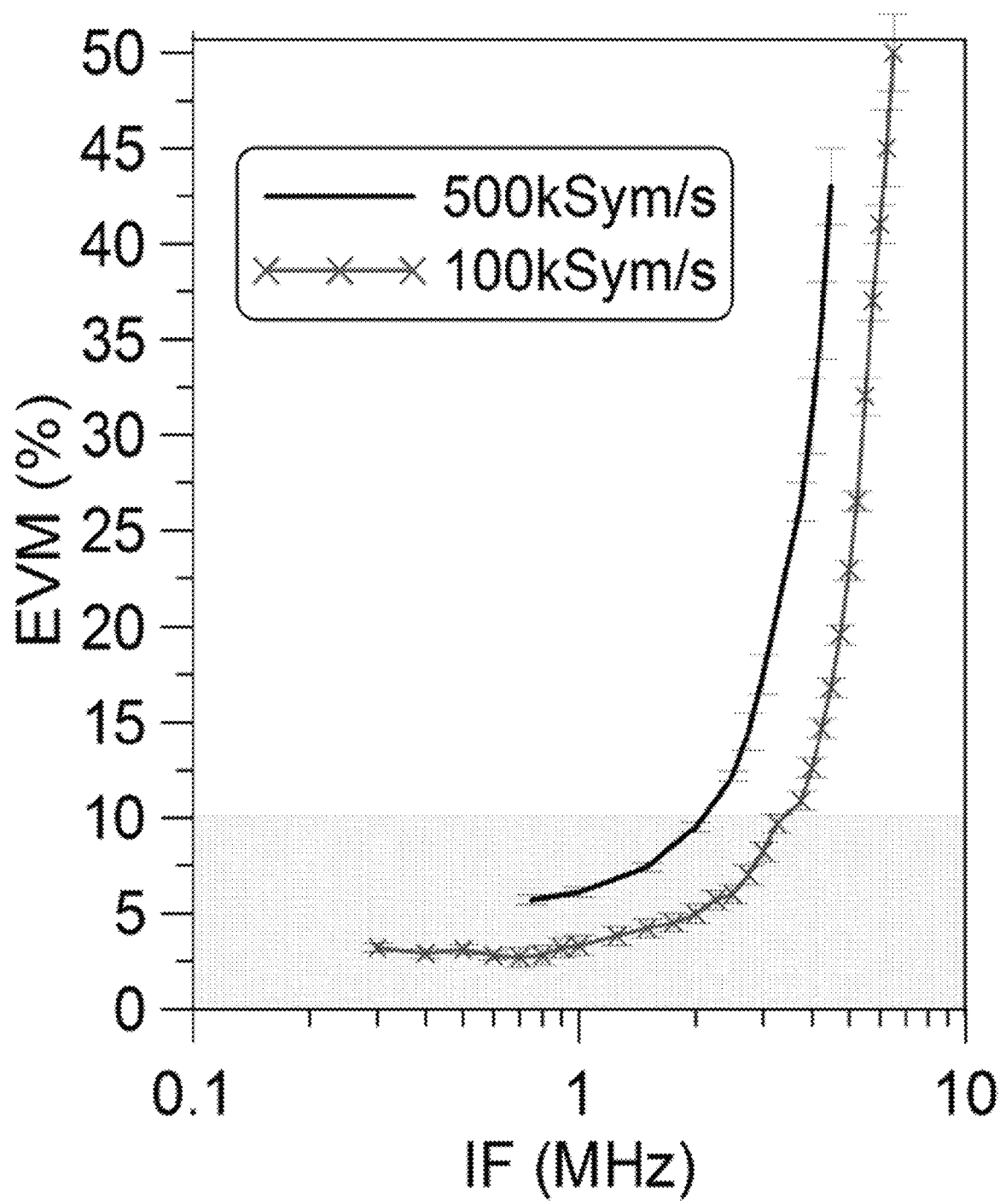
FIG. 10 shows measured EVM for BPSK for different IF, wherein error bars represent variability in measured EVM, and a bandwidth of the photodetector and VSA are 10 MHz.

In communications, an IQ constellation diagram (IQ stands for in-phase and quadrature components of the modulated signal; also called a polar or vector diagram) is used to represent the phase state of a symbol (i.e., in our case the phase and amplitude of the IF signal). Furthermore, a metric to assess how well a digital signal (a bit stream) is detected is the error vector magnitude (EVM). EVM is an error vector of the measured (received) phase/amplitude state compared to the ideal state and is basically an assessment of the received modulation quality. The VSA can generate the IQ diagram for the detected signal and calculate the EVM of the received bit stream. The IQ diagram for receiving 2047 symbols is shown in FIG. 9. FIG. 9 shows the received IQ diagrams for the Rydberg atom receiver for five different modulation schemes (BPSK, QPSK, 16QAM, 32QAM, and 64QAM), each with an IF=1 MHz and the symbol rate of 100 kSym/s. The grouping of the data is that various quadrants correspond to the reception of the possible phase/amplitude states for the different modulation schemes.

Figure 11:
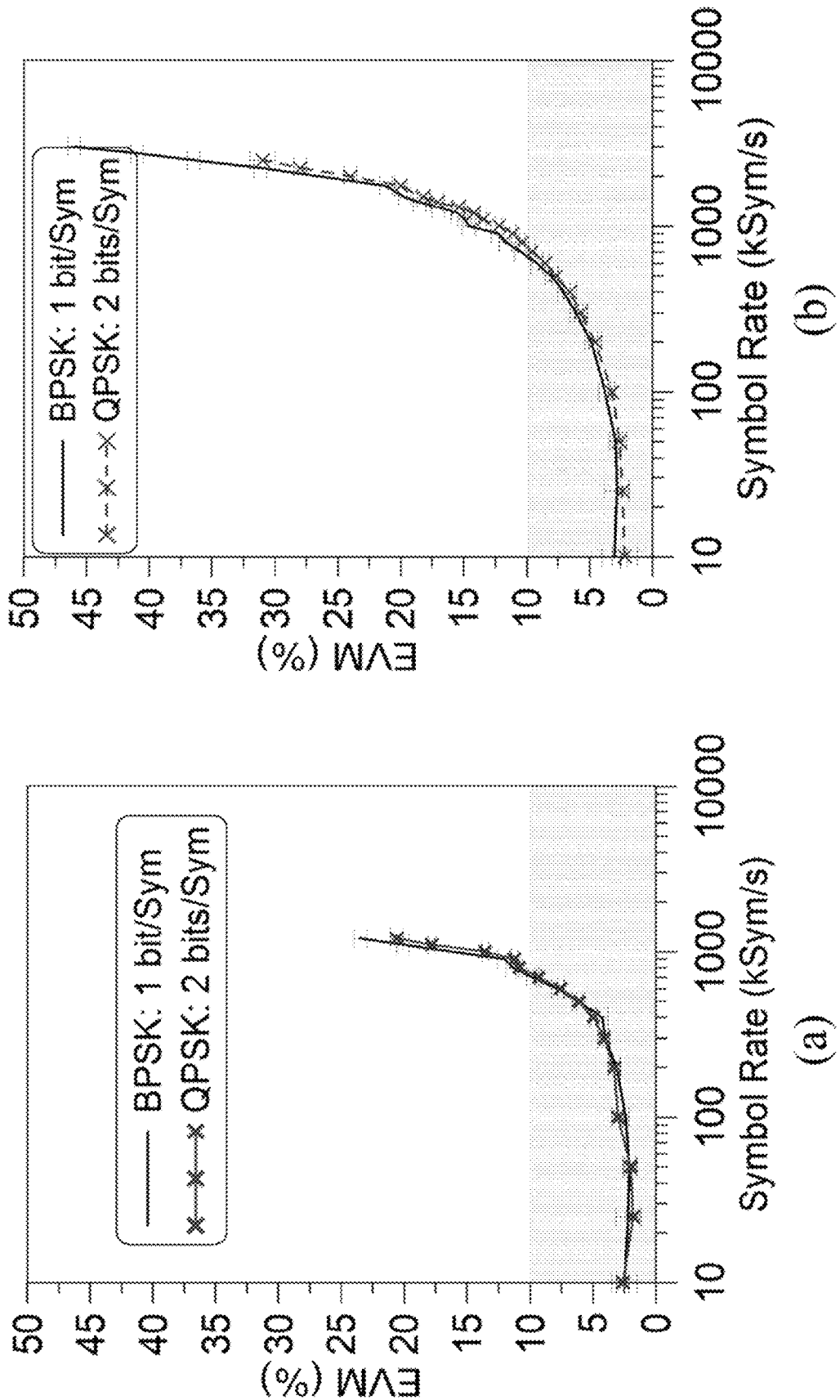
FIG. 11 shows measured EVM for BPSK and QPSK. (a) IF=1 MHz and (b) IF=2 MHz, wherein a bandwidth of the photodetector and VSA are 10 MHz.

With regard to the bandwidth of the Rydberg atom-based receiver, the bandwidth limit is due to the time required to populate the atoms to a Rydberg state. A numerical time-domain calculation of the master equation for the density matrix components shows that the population of the Rydberg state reaches steady state around 1 µs, but has significant population by 0.1-0.3 µs, which implies that the atoms can respond on the order of 3-10 MHz. While the Rydberg state may not be fully populated in 0.3 µs (3 MHz), the atom-based mixer can detect and receive digital signals for data rate above 5 MHz (but the EVM starts to become large). For this atom-based mixer approach, varying the IF value gives an indication of the maximum data rate for digital signals that can be detected. In effect, the atoms respond to the IF signal; as a result, the higher the IF, the faster the atoms have to respond. FIG. 11 shows the EVM as a function of IF for a BPSK signal for two different symbols rates. We see that at around 1 MHz, the EVM starts to increase, and at around 2-3 MHz, the EVM increases above 10%, but data are still received for IF>3 MHz. Next, we set IF to 1 and 2 MHz, then varied the symbol rate. FIG. 11 shows the EVM as a function of symbol rate for BPSK. Here, we see that the EVM is below 5% for symbol rates below 400 kSym/s for both IF values. The EVM approaches 10% for symbol rate around 700 kSym/s in both cases. The EVM continues to increase with increasing symbol rate. We should point out that, as one might expect, once the period of the IF becomes smaller than the symbol period, it becomes difficult to detect the different phases of the carrier (i.e., when the IF wavelength is larger than the symbol length). While the high symbol rates are approaching the bandwidth of the Rydberg atoms, the atom-based mixer still detects and receives BPSK signals with the caveat that the EVM does increase with high symbol rate.

Next, we transmitted a QPSK signal (an example of an IQ diagram is shown in FIG. 9). The EVM for QPSK versus symbol rate is shown in FIG. 11. We see that the QPSK follows the BPSK results. However, keep in mind that the QPSK transmits 2 bits/symbol, while BPSK transmits only 1 bit/symbol. Here, again, once the period of the IF becomes smaller than the symbol rate, it becomes difficult to detect the phase states of the carrier.

Figure 12:
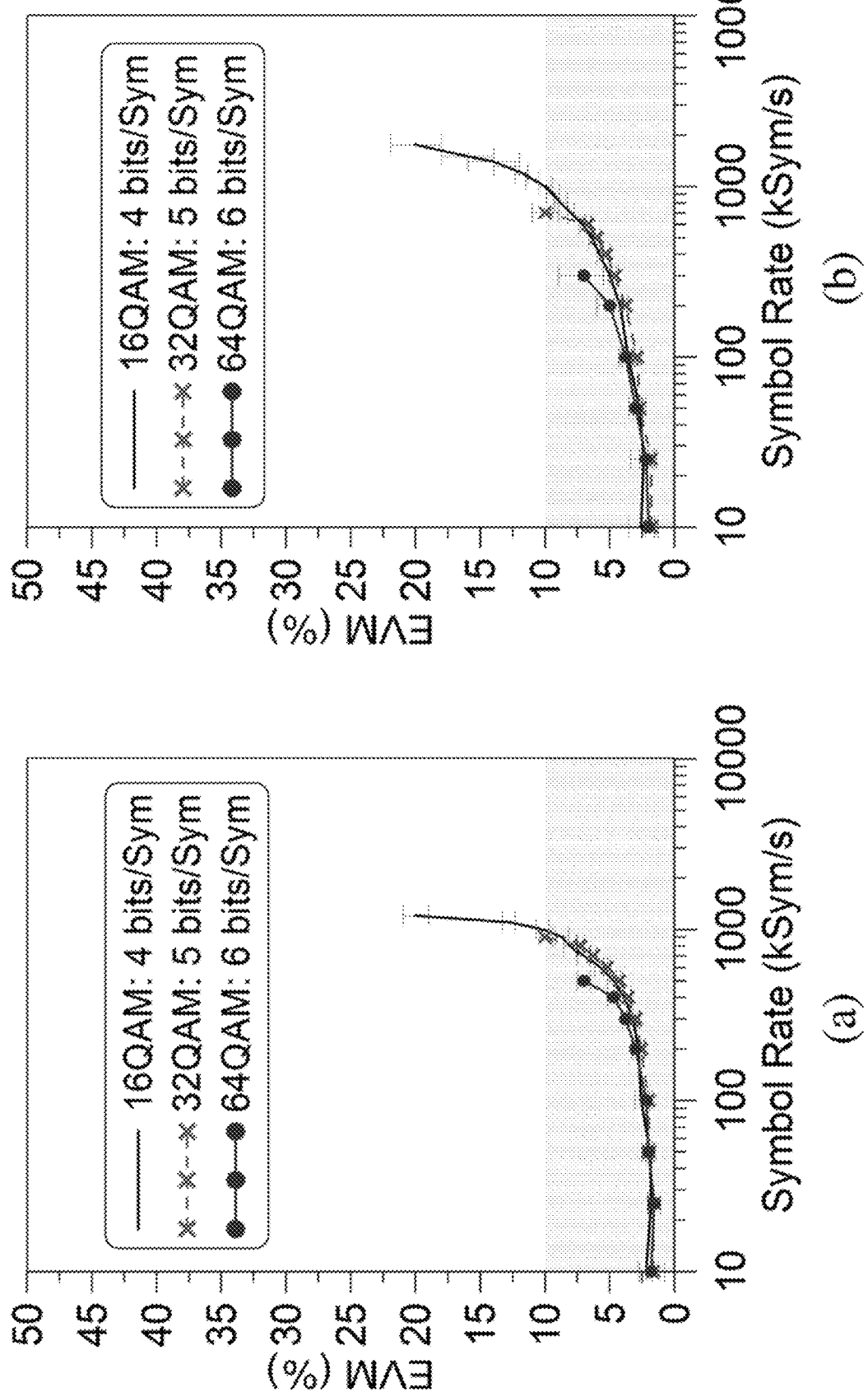
FIG. 12 shows measured EVM for 16QAM, 32QAM, and 64QAM. (a) IF=1 MHz and (b) IF=2 MHz, wherein a bandwidth of the photodetector and VSA are 10 MHz.

Finally, we transmitted 16QAM, 32QAM, and 64QAM signals (IQ diagrams are shown in FIG. 9). These 16QAM, 32QAM, and 64QAM are actually transmitting 4 bits/symbol, 5 bits/symbol, and 6 bits/symbol, respectively. The EVMs for 16QAM, 32QAM, and 64QAM are shown in FIG. 12. From the IQ diagrams, we see that the phase states for the various QAM schemes become more crowded as the number of bits per symbol increases (i.e., going from 16QAM to 32QAM). As such, a small error in the phase states will affect 64QAM more than 16QAM. This is indicated in the EVM data shown in FIG. 12. The point where 32QAM cannot be received (the right side of the EVM curve where the data stop) occurs at a smaller symbol rate than the point where 16QAM cannot be received, and 64QAM falls off even faster.

While BPSK and QPSK are pure phase-modulation schemes, QAM requires modulation of both the phase and the amplitude. The detected amplitudes from the atom-based mixer drops with higher IF values, and it becomes hard to distinguish changes in the amplitude (required for the QAM scheme). This explains why the QAM scheme degrades before BPSK and QPSK schemes.

The results show that a Rydberg atom-based mixer detects and receives various phase and amplitude digital modulation schemes (BPSK, QPSK, 16QAM, 32QAM, and 64QAM). The atom-based mixer can detect and receive digital signals as the transmitted symbol rate approaches the bandwidth of the Rydberg atom response, which is around 1-10 MHz (and is likely the limit of the IF that can be used for the Rydberg atom-based mixer). The EVM does increase with symbol rate, though data can be received even for high EVM through the use of error correction techniques. The Rydberg atom-based digital receiver has many benefits over conventional technologies in detecting and receiving modulated signals. For example: no need for traditional demodulation/downconversion electronics because the atoms automatically perform the demodulation for AM and FM signals and automatically downconvert the phase-modulated signals to an IF; a micrometer-sized antennas and receivers over a frequency range of 100 MHz to 1 THz; no Chu limit requirements as is the case for standard antennas; direct real-time read-out; multiband (or multichannel) operation in one compact vapor cell; electromagnetic interference-free receiving; ultrahigh sensitivity reception from 100 MHz to 1 THz.

Field levels down to 40 V/m are detectable, and using a field enhancement technique provides lower field levels configurations. Furthermore, the Rydberg atom-based system can be less susceptible to noise. As was the case in measuring CW electric-field strengths, where we performed experiments measuring CW E-field strengths using this atom-based approach in the presence of band-limited white Gaussian noise, we showed that the E-field strength could be detected in low CW-signal-to-noise-power ratio conditions. The detection scheme here can include reduced laser noise and systematic effects.

Rydberg atom-based sensors can include compact and inexpensive coupling lasers for a wide array of applications, including communication receivers. Rydberg atom approach over conventional radio technologies provides a Rydberg atom-based receiver/antenna system to detect and demodulate BPSK, QPSK, and QAM signals for interrogation of ensembles of atoms to such accuracy that such can receive data from phase-modulation schemes used for digital communications.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Optional or optionally means that the subsequently described event or circumstance can or cannot occur, and that the description includes instances where the event occurs and instances where it does not. As used herein, combination is inclusive of blends, mixtures, alloys, reaction products, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms a and an and the and similar referents in the context of describing the invention (especially in the context of the following claims) are to be construed to cover both the singular and the plural, unless otherwise indicated herein or clearly contradicted by context. Or means and/or. It can further be noted that the terms first, second, primary, secondary, and the like herein do not denote any order, quantity, or importance, but rather are used to distinguish one element from another. The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A quantum atomic receiving antenna comprising:
   a probe laser that produces a probe light that comprises a probe frequency that is resonant with a probe electronic transition of a gaseous Rydberg antenna atom;
   a coupling laser that produces a coupling light that comprises a coupling frequency that is resonant with a Rydberg electronic transition of the gaseous Rydberg antenna atom;
   a spherical atomic vapor cell that comprises:
      a spherically-shaped atomic vapor space that receives a plurality of gaseous Rydberg antenna atoms; and
      an atomic vapor cell wall comprising a spherically symmetric interior that physically bounds the atomic vapor space to contain the gaseous Rydberg antenna atoms in the atomic vapor space, such that the atomic vapor cell:
         receives the probe light from the probe laser, the coupling light from the coupling laser, a radiofrequency radiation from an external radiofrequency source; and
         subjects the gaseous Rydberg antenna atoms to the probe light, and the gaseous Rydberg antenna atoms undergo the probe electronic transition from a first electronic state to an intermediate excited electronic state in response to receiving the probe light;
         subjects the gaseous Rydberg antenna atoms to the coupling light, and the gaseous Rydberg antenna atoms in the intermediate excited electronic state undergo the Rydberg electronic transition from the intermediate excited electronic state to a Rydberg electronic state in response to receiving the coupling light;
         subjects the gaseous Rydberg antenna atoms to the radiofrequency radiation, and the gaseous Rydberg antenna atoms in the Rydberg electronic state undergo the Radiofrequency Rydberg transition from the Rydberg electronic state to a final Rydberg electronic state in response to receiving the radiofrequency radiation; and
         produces quantum antenna light from the probe light in response to the gaseous Rydberg antenna atom being subjected to the probe light, the coupling light, or the radiofrequency radiation, such that an intensity of the quantum antenna light depends on an amount of radiofrequency radiation received by gaseous Rydberg antenna atoms in the Rydberg electronic state, the quantum antenna light comprising a strength, direction, and polarization of the radiofrequency radiation; and
   a quantum antenna light detector in optical communication with the atomic vapor cell and that receives the quantum antenna light from the atomic vapor cell and produces a quantum antenna electronic signal from the quantum antenna light, such that the quantum antenna electronic signal comprises the strength, direction, and polarization of the radiofrequency radiation,
   wherein an RF field distribution of the radiofrequency radiation inside the atomic vapor cell does not depend on a direction of propagation of the radiofrequency radiation with respect to receipt of the radiofrequency radiation by the atomic vapor cell.

2. The quantum atomic receiving antenna of claim 1, further comprising a first dichroic mirror in communication with the probe laser and the atomic vapor cell and that receives the probe light from the probe laser, reflects the probe light and communicates the probe light to the atomic vapor cell, and receives the coupling light from the atomic vapor cell, and communicates the probe light away from the atomic vapor cell.

3. The quantum atomic receiving antenna of claim 2, further comprising a second dichroic mirror in communication with the coupling laser and the atomic vapor cell and that receives the coupling light from the coupling laser, reflects the coupling light and communicates the coupling light to the atomic vapor cell, and receives the quantum antenna light from the atomic vapor cell, and communicates the quantum antenna light to the quantum antenna light detector.

4. The quantum atomic receiving antenna of claim 1, further comprising a signal analyzer in communication with the quantum antenna light detector and that receives the quantum antenna electronic signal from the quantum antenna light detector and produces a radiofrequency detection signal from the quantum antenna electronic signal, wherein the radiofrequency detection signal comprises the strength, direction, or polarization of the radiofrequency radiation.

5. The quantum atomic receiving antenna of claim 4, wherein the radiofrequency detection signal comprises an in-phase quadrature map.

6. The quantum atomic receiving antenna of claim 1, further comprising a modulation analyzer in communication with the quantum antenna light detector and that receives the quantum antenna electronic signal from the quantum antenna light detector and produces a probe waveform from the quantum antenna electronic signal.

7. The quantum atomic receiving antenna of claim 1, further comprising an external radiofrequency source that produces the radiofrequency radiation, and communicates the radiofrequency radiation to the atomic vapor cell.

8. The quantum atomic receiving antenna of claim 7, wherein the external radiofrequency source comprises:
a reference radiofrequency source that produces a reference radiofrequency radiation;
a modulated carrier source that produces a modulated carrier radiation;
a power combiner in communication with the reference radiofrequency source and the modulated carrier source and that receives the reference radiofrequency radiation from the reference radiofrequency source and the modulated carrier radiation from the modulated carrier source, combines the reference radiofrequency radiation and the modulated carrier radiation, and produces a combined radiofrequency radiation comprising the reference radiofrequency radiation and the modulated carrier radiation; and
a radiofrequency output antenna in communication with the power combiner and the atomic vapor cell and that receives the combined radiofrequency radiation from the power combiner, produces the radiofrequency radiation from the combined radiofrequency radiation, and communicates the radiofrequency radiation to the atomic vapor cell.

9. The quantum atomic receiving antenna of claim 8, wherein the radiofrequency radiation comprises the modulated carrier radiation and the reference radiofrequency radiation, and the radio transition frequency is resonant with the radiofrequency Rydberg transition of the gaseous Rydberg antenna atoms.

10. The quantum atomic receiving antenna of claim 1, wherein the radiofrequency radiation comprises a frequency from 1 GHz to 1 THz.

11. The quantum atomic receiving antenna of claim 1, wherein the atomic vapor cell wall comprises a dielectric material that optically communicates the probe light and the coupling light and communicates the radiofrequency radiation through the atomic vapor cell wall to the atomic vapor space.

12. A quantum atomic receiving antenna comprising:
a probe laser that produces a probe light that comprises a probe frequency that is resonant with a probe electronic transition of a gaseous Rydberg antenna atom;
a coupling laser that produces a coupling light that comprises a coupling frequency that is resonant with a Rydberg electronic transition of the gaseous Rydberg antenna atom;
a parallelepiped atomic vapor cell that comprises:
a parallelepiped-shaped atomic vapor space that receives a plurality of gaseous Rydberg antenna atoms; and
an atomic vapor cell wall comprising a parallelepiped-shaped interior that physically bounds the atomic vapor space to contain the gaseous Rydberg antenna atoms in the atomic vapor space, such that the atomic vapor cell:
receives the probe light from the probe laser, the coupling light from the coupling laser, a radiofrequency radiation from an external radiofrequency source; and
subjects the gaseous Rydberg antenna atoms to the probe light, and the gaseous Rydberg antenna atoms undergo the probe electronic transition from a first electronic state to an intermediate excited electronic state in response to receiving the probe light;
subjects the gaseous Rydberg antenna atoms to the coupling light, and the gaseous Rydberg antenna atoms in the intermediate excited electronic state undergo the Rydberg electronic transition from the intermediate excited electronic state to a Rydberg electronic state in response to receiving the coupling light;
subjects the gaseous Rydberg antenna atoms to the radiofrequency radiation, and the gaseous Rydberg antenna atoms in the Rydberg electronic state undergo the Radiofrequency Rydberg transition from the Rydberg electronic state to a final Rydberg electronic state in response to receiving the radiofrequency radiation; and
produces quantum antenna light from the probe light in response to the gaseous Rydberg antenna atom being subjected to the probe light, the coupling light, or the radiofrequency radiation, such that an intensity of the quantum antenna light depends on an amount of radiofrequency radiation received by gaseous Rydberg antenna atoms in the Rydberg electronic state, the quantum antenna light comprising a strength, direction, and polarization of the radiofrequency radiation; and
a quantum antenna light detector in optical communication with the atomic vapor cell and that receives the quantum antenna light from the atomic vapor cell and produces a quantum antenna electronic signal from the quantum antenna light, such that the quantum antenna electronic signal comprises the strength, direction, and polarization of the radiofrequency radiation,
wherein an RF field distribution of the radiofrequency radiation inside the atomic vapor cell depends on a direction of propagation of the radiofrequency radiation with respect to receipt of the radiofrequency radiation by the atomic vapor cell.

13. The quantum atomic receiving antenna of claim 12, further comprising a first dichroic mirror in communication with the probe laser and the atomic vapor cell and that receives the probe light from the probe laser, reflects the probe light and communicates the probe light to the atomic vapor cell, and receives the coupling light from the atomic vapor cell, and communicates the probe light away from the atomic vapor cell.

14. The quantum atomic receiving antenna of claim 13, further comprising a second dichroic mirror in communication with the coupling laser and the atomic vapor cell and that receives the coupling light from the coupling laser, reflects the coupling light and communicates the coupling light to the atomic vapor cell, and receives the quantum antenna light from the atomic vapor cell, and communicates the quantum antenna light to the quantum antenna light detector.

15. The quantum atomic receiving antenna of claim 12, further comprising a signal analyzer in communication with the quantum antenna light detector and that receives the quantum antenna electronic signal from the quantum antenna light detector and produces a radiofrequency detection signal from the quantum antenna electronic signal, wherein the radiofrequency detection signal comprises the strength, direction, or polarization of the radiofrequency radiation.

16. The quantum atomic receiving antenna of claim 15, wherein the radiofrequency detection signal comprises an in-phase quadrature map.

17. The quantum atomic receiving antenna of claim 12, further comprising a modulation analyzer in communication with the quantum antenna light detector and that receives the quantum antenna electronic signal from the quantum antenna light detector and produces a probe waveform from the quantum antenna electronic signal.

18. The quantum atomic receiving antenna of claim 12, further comprising an external radiofrequency source that produces the radiofrequency radiation, and communicates the radiofrequency radiation to the atomic vapor cell.

19. The quantum atomic receiving antenna of claim 18, wherein the external radiofrequency source comprises:
   a reference radiofrequency source that produces a reference radiofrequency radiation;
   a modulated carrier source that produces a modulated carrier radiation;
   a power combiner in communication with the reference radiofrequency source and the modulated carrier source and that receives the reference radiofrequency radiation from the reference radiofrequency source and the modulated carrier radiation from the modulated carrier source, combines the reference radiofrequency radiation and the modulated carrier radiation, and produces a combined radiofrequency radiation comprising the reference radiofrequency radiation and the modulated carrier radiation; and
   a radiofrequency output antenna in communication with the power combiner and the atomic vapor cell and that receives the combined radiofrequency radiation from the power combiner, produces the radiofrequency radiation from the combined radiofrequency radiation, and communicates the radiofrequency radiation to the atomic vapor cell.

20. The quantum atomic receiving antenna of claim 19, wherein the radiofrequency radiation comprises the modulated carrier radiation and the reference radiofrequency radiation, and the radio transition frequency is resonant with the radiofrequency Rydberg transition of the gaseous Rydberg antenna atoms.

21. The quantum atomic receiving antenna of claim 12, wherein the radiofrequency radiation comprises a frequency from 1 GHz to 1 THz.

22. The quantum atomic receiving antenna of claim 12, wherein the atomic vapor cell wall comprises a dielectric material that optically communicates the probe light and the coupling light and communicates the radiofrequency radiation through the atomic vapor cell wall to the atomic vapor space.

23. A process for quantum sensing of radiofrequency radiation with a quantum atomic receiving antenna, the process comprising:
   producing probe light that comprises a probe frequency that is resonant with a probe electronic transition of a gaseous Rydberg antenna atom;
   producing a coupling light that comprises a coupling frequency that is resonant with a Rydberg electronic transition of the gaseous Rydberg antenna atom;
   receiving, by an atomic vapor cell, a plurality of gaseous Rydberg antenna atoms in an atomic vapor space of the atomic vapor cell that is physically bounded by an atomic vapor cell wall to contain the gaseous Rydberg antenna atoms in the atomic vapor space;
   receiving, by the atomic vapor cell, the probe light, the coupling light, and a radiofrequency radiation;
   subjecting, in the atomic vapor cell, the gaseous Rydberg antenna atoms to the probe light;
   undergoing, by the gaseous Rydberg antenna atoms, the probe electronic transition from a first electronic state to an intermediate excited electronic state in response to receiving the probe light;
   subjecting, in the atomic vapor cell, the gaseous Rydberg antenna atoms to the coupling light;
   undergoing, by the gaseous Rydberg antenna atoms in the intermediate excited electronic state, the Rydberg electronic transition from the intermediate excited electronic state to a Rydberg electronic state in response to receiving the coupling light;
   subjecting, in the atomic vapor cell, the gaseous Rydberg antenna atoms to the radiofrequency radiation;
   undergoing, by the gaseous Rydberg antenna atoms in the Rydberg electronic state, the radiofrequency Rydberg transition from the Rydberg electronic state to a final Rydberg electronic state in response to receiving the radiofrequency radiation;
   producing quantum antenna light from the probe light in response to the gaseous Rydberg antenna atom being subjected to the probe light, the coupling light, or the radiofrequency radiation, such that an intensity of the quantum antenna light depends on an amount of radiofrequency radiation received by gaseous Rydberg antenna atoms in the Rydberg electronic state, wherein the quantum antenna light comprises a strength, direction, and polarization of the radiofrequency radiation;
   receiving, by a quantum antenna light detector in optical communication with the atomic vapor cell, the quantum antenna light from the atomic vapor cell;
   producing, by the quantum antenna light detector, a quantum antenna electronic signal from the quantum antenna light, such that the quantum antenna electronic signal comprises the strength, direction, and polarization of the radiofrequency radiation,
   wherein the atomic vapor cell comprises a a spherically-shaped interior of the atomic vapor cell wall or a parellelpiped-shaped interior of the atomic vapor cell wall, such that:
      for the spherically-shaped interior of the atomic vapor cell, an RF field distribution of the radiofrequency radiation inside the atomic vapor cell does not depend on a direction of propagation of the radiofrequency radiation with respect to receipt of the radiofrequency radiation by the atomic vapor cell, and
      for the parellelpiped-shaped interior of the atomic vapor cell, the RF field distribution of the radiofrequency radiation inside the atomic vapor cell depends on a direction of propagation of the radiofrequency radiation with respect to receipt of the radiofrequency radiation by the atomic vapor cell.

24. The process of claim 23, further comprising receiving, by a signal analyzer in communication with the quantum antenna light detector, the quantum antenna electronic signal from the quantum antenna light detector; and producing a radiofrequency detection signal from the quantum antenna electronic signal, wherein the radiofrequency detection signal comprises the strength, direction, or polarization of the radiofrequency radiation.

25. The process of claim 23, further comprising:

receiving, by a modulation analyzer in communication with the quantum antenna light detector, the quantum antenna electronic signal from the quantum antenna light detector; and producing a probe waveform from the quantum antenna electronic signal.

26. The process of claim 23, further comprising:

producing a reference radiofrequency radiation;

producing a modulated carrier radiation;

combining the reference radiofrequency radiation and the modulated carrier radiation as the radiofrequency radiation; and communicating the radiofrequency radiation to the atomic vapor cell.

* * * * *